US009979202B2

(12) United States Patent
Sudan et al.

(10) Patent No.: US 9,979,202 B2
(45) Date of Patent: May 22, 2018

(54) CONTROL, PROTECTION AND POWER MANAGEMENT SYSTEM FOR AN ENERGY STORAGE SYSTEM

(71) Applicant: Ecamion Inc., Markham (CA)

(72) Inventors: Himanshu Sudan, Toronto (CA); Carmine Pizzurro, Markham (CA); Reza Iravani, Toronto (CA); Milan Graovac, Toronto (CA)

(73) Assignee: Ecamion Inc. (CA)

( * ) Notice: Subject to any disclaimer, the term of this patent is extended or adjusted under 35 U.S.C. 154(b) by 205 days.

(21) Appl. No.: 14/372,852

(22) PCT Filed: Jan. 17, 2013

(86) PCT No.: PCT/CA2013/000029
§ 371 (c)(1),
(2) Date: Jul. 17, 2014

(87) PCT Pub. No.: WO2013/106906
PCT Pub. Date: Jul. 25, 2013

(65) Prior Publication Data
US 2014/0354234 A1 Dec. 4, 2014

Related U.S. Application Data

(60) Provisional application No. 61/587,649, filed on Jan. 17, 2012.

(51) Int. Cl.
*H02J 4/00* (2006.01)
*H02J 3/00* (2006.01)
*H02J 7/34* (2006.01)
*H02J 13/00* (2006.01)
*H02J 7/00* (2006.01)
*H02J 3/28* (2006.01)

(52) U.S. Cl.
CPC .............. *H02J 4/00* (2013.01); *H02J 7/0055* (2013.01); *H02J 7/0063* (2013.01); *H02J 7/34* (2013.01); *H02J 13/002* (2013.01); *H02J 3/28* (2013.01); *Y02E 60/722* (2013.01); *Y04S 10/14* (2013.01); *Y10T 307/305* (2015.04)

(58) Field of Classification Search
CPC ....................................................... H02J 4/00
USPC ....................................................... 320/127
See application file for complete search history.

(56) References Cited

U.S. PATENT DOCUMENTS 5,369,353 A * 11/1994 Erdman ................ H02J 3/1842
323/207
7,002,260 B2 2/2006 Stahlkopf
8,749,207 B2 * 6/2014 Huomo ................ H02J 3/1892
323/207

(Continued)

*Primary Examiner* — Drew A Dunn
*Assistant Examiner* — Jerry D Robbins
(74) *Attorney, Agent, or Firm* — Tarolli, Sundheim, Covell & Tummino LLP

(57) ABSTRACT

A control, protection and power management system for an energy storage system, comprises an interface configured to communicate and provide energy exchange with a host power system, a local load, and the energy storage system, and processing structure configured to receive signals from the host power system and the energy storage system, to determine a mode of operation of the energy storage system and to provide control, protection and power management to the energy storage system.

17 Claims, 15 Drawing Sheets

(56) References Cited

U.S. PATENT DOCUMENTS

| | | | | |
|---|---|---|---|---|
| 8,766,590 B2 * | 7/2014 | Lee | ............................ | H02J 3/32 320/101 |
| 2004/0158360 A1 * | 8/2004 | Garland, II | ............. | G06Q 50/06 700/286 |
| 2004/0207207 A1 * | 10/2004 | Stahlkopf | ............... | F03D 9/005 290/44 |
| 2009/0134717 A1 * | 5/2009 | Marks | ...................... | H02J 15/00 307/149 |
| 2009/0326725 A1 * | 12/2009 | Carlson | ................. | G06F 1/3203 700/291 |
| 2010/0023174 A1 * | 1/2010 | Nagata | ....................... | H02J 3/32 700/287 |
| 2011/0004446 A1 * | 1/2011 | Dorn | ....................... | G01D 4/002 702/188 |
| 2011/0093127 A1 * | 4/2011 | Kaplan | ................... | G06Q 10/04 700/292 |
| 2011/0115295 A1 * | 5/2011 | Moon | ........................ | H02J 3/32 307/65 |
| 2012/0029720 A1 * | 2/2012 | Cherian | .................. | H02J 13/00 700/297 |
| 2012/0316688 A1 * | 12/2012 | Boardman | ........... | H02J 13/0079 700/291 |
| 2013/0155734 A1 * | 6/2013 | El-Barbari | ............... | H02J 3/383 363/55 |

\* cited by examiner

CONTROL, PROTECTION AND POWER MANAGEMENT SYSTEM FOR AN ENERGY STORAGE SYSTEM

FIELD OF THE INVENTION

The present invention relates to a control, protection and power management system for an energy storage system.

BACKGROUND OF THE INVENTION

The modernization of the power industry has led to the development of smart grids. Smart grids are electrical grids which predict and intelligently respond to the behavior and actions of connected suppliers, consumers, transmission networks and distribution networks. Smart grids provide capacity for various types of power generation including power generation by renewable resources such as wind and solar systems. Real-time monitoring and control of smart grid generation units is desired to ensure energy consumption/production efficiency, proper management of power flows, voltage/angle stability, response to market signals, and overall system reliability.

U.S. Pat. No. 7,002,260 to Stahlkopf discloses a power control interface between an unstable power source such as a wind farm and a power transmission line. The power control interface employs an electrical energy storage, a control system, and an electronic compensation module which act together like an "electronic shock absorber" for storing excess power during periods of increased power generation and for releasing stored energy during periods of decreased power generation due to wind fluctuations. The control system is provided with a "look ahead" capability for predicting power output (wind speed conditions) and maintaining energy storage or release over a "narrow-band" range despite short duration fluctuations. The control system uses data derived from monitoring the wind farm power output and the power transmission line, and employs system-modeling algorithms to predict narrow-band wind speed conditions. The power control interface can also use its energy storage capacity to provide voltage support at the point of injection into the power transmission system, as well as fault clearance capability for "riding out" transient fault conditions occurring on the power transmission line.

U.S. Patent Application Publication No. 2011/0115295 to Moon et al. discloses an energy management system including a first interface configured to receive a first power from a power generation system, a second interface configured to couple to the power generation system, a power grid, and a storage device, and to receive at least one of the first power from the power generation system, a second power from the power grid, or a third power from the storage device, and to supply a fourth power to at least one of the power grid or a load, and a third interface configured to receive the third power from the storage device, and to supply a fifth power to the storage device for storage.

Although power control interfaces and energy management systems have been considered, improvements are desired.

It is therefore an object at least to provide a novel control, protection and power management system for an energy storage system.

SUMMARY OF THE INVENTION

Accordingly, in one aspect there is provided a control, protection and power management system for an energy storage system, comprising an interface for communicating and providing energy exchange with a host power system, a local load, and the energy storage system, processing structure for receiving signals from the host power system and the energy storage system to determine a mode of operation of the energy storage system and provide control, protection and power management to the energy storage system.

In an embodiment, the mode of operation of the energy storage system is one of an active mode, an injection mode, an absorption mode, a reactive mode, a filter mode, and an inactive mode. The energy storage system comprises a plurality of battery modules. The battery modules are lithium-ion battery modules. During operation in the active mode, the energy storage system provides power control. During operation in the injection mode, the energy storage system injects reactive power into the host power system and charges the batteries. During operation in the absorption mode, the energy storage system absorbs reactive power from the host power system and discharges the batteries. During operation in the reactive mode, the battery storage system provides power control. During operation in the filter mode, the energy storage system operates as an active filter. During operation in the inactive mode, the energy storage system is inactive.

In an embodiment, the host power system comprises a transmission grid and a distribution grid. The processing structure is further configured to determine if the distribution system is operating in one of an islanded mode and a grid-connected mode.

In an embodiment, the processing structure is further configured to provide islanding detection. The islanding detection comprises detecting separation of the energy storage system and the local load from the host power system. The islanding detection comprises detecting separation of the energy storage system, the local load and a portion of the host power system from the rest of the host power system.

According to another aspect there is provided a method for providing control, protection and power management for an energy storage system, the method comprising communicating and providing energy exchange with a host power system, a local load and the energy storage system via an interface, receiving signals from the host power system and the energy storage system, and processing the received signals to determine a mode of operation of the energy storage system and to provide control, protection and power management to the energy storage system.

BRIEF DESCRIPTION OF THE DRAWINGS

Embodiments will now be described more fully with reference to the accompanying drawings in which.

DETAILED DESCRIPTION OF THE EMBODIMENTS

Figure 1:
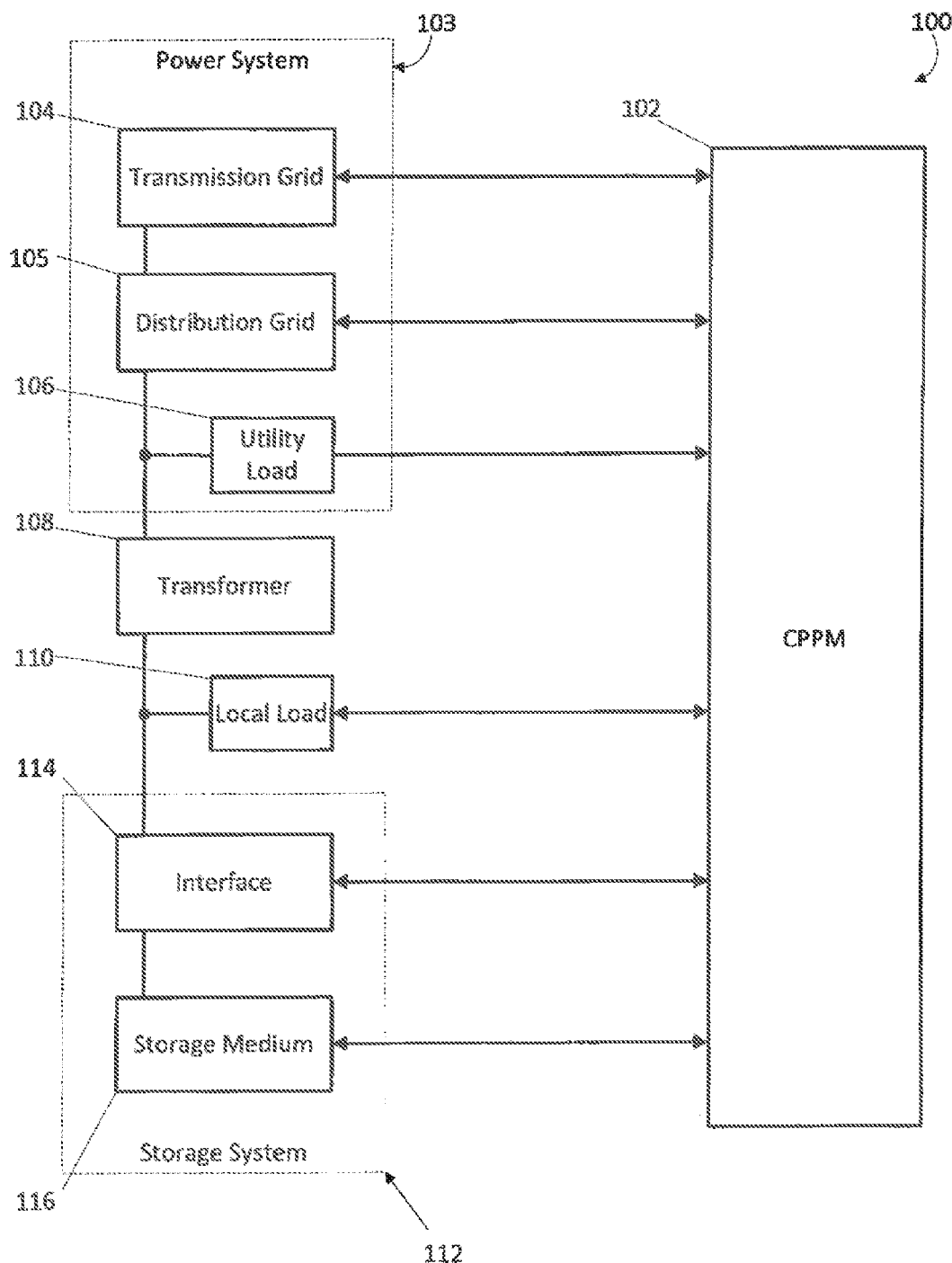
FIG. 1 is a block diagram of a smart grid comprising a control, protection and power management unit.

Turning now to FIG. 1, a smart grid is shown and is generally identified by reference numeral 100. In this embodiment, the smart grid 100 comprises a control, protection and power management (CPPM) unit 102. The CPPM unit 102 is connected to a power system 103 comprising a transmission grid 104, a distribution grid 105, and a utility load 106. The power system 103 is connected to a transformer 108, a local load 110, and a storage system 112 that comprises a storage interface 114 and a storage medium 116. The CPPM unit 102 processes signals received from the transmission grid 104, distribution grid 105, utility load 106, local load 110 and storage system 112 to control, protect, operate and manage the operation of the storage system 112 under various operating conditions and scenarios of the power system 103.

The transmission grid 104 bi-directionally communicates with the CPPM unit 102 and sends market signals, measured data and calculated data from both local and remote nodes thereof to the CPPM unit 102. In this embodiment, the measured data and calculated data comprise currents, voltages, frequency, real-power, reactive-power, power factor, switch status, as well as specific commands from substations and control centers associated with the transmission grid 104. The CPPM unit 102 processes the received signals and data and sends command and control signals back to the transmission grid 104 related to the operation of the storage system 112, as will be described.

The distribution grid 105 bi-directionally communicates with the CPPM unit 102. The distribution grid 105 also sends market signals, measured data and calculated data from both local and remote nodes thereof to the CPPM unit 102. In this embodiment, the measured data and calculated data similarly comprise currents, voltages, frequency, real-power, reactive-power, power factor, switch status, as well as specific commands from substations and control centers associated with the distribution grid 105. The CPPM unit 102 processes the received signals and data and sends command and control signals back to the distribution grid 105 related to the operation of the storage system 112, as will be described.

The utility load 106 uni-directionally communicates with the CPPM unit 102 and sends measured data and calculated data to the CPPM unit 102. In this embodiment, the measured data and calculated data comprise currents, voltages, frequency, real-power, reactive-power, power factor, market signals and switch status.

The transformer 108 is a utility transformer connected between the distribution grid 105 and the storage system 112. In modes where the storage system 112 is connected to the transmission grid 104, the transformer 108 connects the storage system 112 to the utility load 106 and the transmission grid 104.

The local load 110 bi-directionally communicates with the CPPM unit 102. The local load 110 sends measured data to the CPPM unit 102. In this embodiment, the measured data comprises currents, voltages, frequency, real-power, reactive-power, power factor and switch status.

In this embodiment, the storage interface 114 is a bidirectional power-flow AC-DC power electronic converter system. The storage interface 114 bi-directionally communicates with the CPPM unit 102 and provides a path for energy exchange between the storage medium 116, the local load 110, the transformer 108 and the power system 103. The storage interface 114 sends signals containing measured and calculated data to the CPPM unit 102. In this embodiment, the measured data and calculated data comprise currents, voltages, protection commands and diagnostics. The CPPM unit 102 processes the received signals and sends command and control signals back to the storage interface 114 to control, protect and manage the operation of the storage medium 116, as will be described. As will be appreciated, the storage interface 114 further comprises an internal control, protection and management system (not shown). The CPPM unit 102 does not override the operation of the internal control, protection and management system unless an emergency scenario has occurred such as for example an internal fault or failure of storage interface 114 or to respond to operator or local manual commands.

The storage system 112 is operable in a plurality of modes including an active_mode, an injection mode, an absorption_mode, a reactive_mode, a filter_mode, an inactive_mode_A and an inactive_mode_B. In the active_mode, the storage system 112 bi-directionally exchanges real power and reactive power with the local load 110 and power system 103 and may provide active power (P)/reactive power (Q) control, active power (P)/voltage (V) control, active power (P)/power factor (PF) control and voltage (V)/frequency (F) control. In the injection_mode, the storage system 112 injects reel power in and bi-directionally exchanges reactive power with the local load 110 and power system 103 and may provide P/Q control and V/F control. In the absorption_mode, the storage system 112 absorbs real power from and bi-directionally exchanges reactive power with the local load 110 and power system 103. In the reactive_mode, the storage system 112 exchanges no real power (except for loss compensation) and bi-directionally exchanges reactive power with the local load 110 and power system 103 and may provide P/Q control and volt-ampere reactive (VAR) control. In the filter_mode, the storage system 112 exchanges no real power (except for loss compensation) and bi-directionally exchanges reactive power for active filtering and flicker mitigation with the local load 110 and power system 103 and may provide filtering control. In the inactive_mode_A, the storage medium 116 is inactive and the storage interface 114 exchanges no real-power (except for loss compensation) and bi-directionally exchanges reactive power with the local load 110 and power system 103. In the Inactive_mode_B, both the storage medium 116 and the storage interface 114 are inactive and the storage system 112 exchanges no real-power (except for loss compensation) and no reactive power with the local load 110 and power system 103. The above modes of operation are determined, controlled and managed by the CPPM 102. Based upon a selected mode of operation, the storage system 112 assists in voltage control, power factor correction, frequency control, and/or real power/reactive power flow control.

In this embodiment, the storage medium 116 is a battery bank comprising a plurality of Lithium-Ion battery modules. The storage medium 116 also bi-directionally communicates with the CPPM unit 102. The storage medium 116 sends signals associated with the state of the storage medium 116 such as the state of charge and diagnostic signals. The charge and diagnostic signals include data such as for example the current, voltage and temperature of different physical locations and electrical nodes and branches of the storage medium 116.

The storage medium 116 also comprises an internal battery management system (BMS) that monitors the temperature and voltage of each battery module, monitors the current output of each battery module, detects abnormal battery operating conditions, protects against over/under voltage, current and/or abnormal temperature conditions etc. The battery management system may be of any known type such as for example those sold by Analog Devices Inc. of Norwood, Mass. or Elithion of Boulder, Colo.

The CPPM unit 102 provides steady-state and quasi steady-state functionality for the storage system 112. In this embodiment, the CPPM unit 102 responds to market signals to tailor the storage system 112 within the permissible range and provide the desired response. The CPPM unit 102 responds to higher level control commands to provide tertiary control, secondary control, and if required, automatic generation control for optimal operation of the power system 103. The CPPM unit 102 responds to internal logic or externally communicated commands to mitigate flicker and harmonics and to meet steady-state power quality issue requirements. The CPPM unit 102 also provides loss minimization.

The CPPM unit 102 further provides dynamic functionality. In this embodiment, in response to system dynamic performance and requirements, the CPPM unit 102 provides real-power control, voltage control, reactive power control, power-factor control, frequency control, dynamic VAR compensation, dynamic active filtering, and any technically possible and/or economically viable combination of these functions.

The CPPM unit 102 also provides protection functionality. In this embodiment, in response to system requirements and operating conditions, the CPPM-unit provides fault ride-through capability, over voltage/under voltage ride-through capability, transient-frequency synchronization capability, fault-current limitation capability, internal fault protection, islanding detection, and anti-islanding capability.

Figure 2:
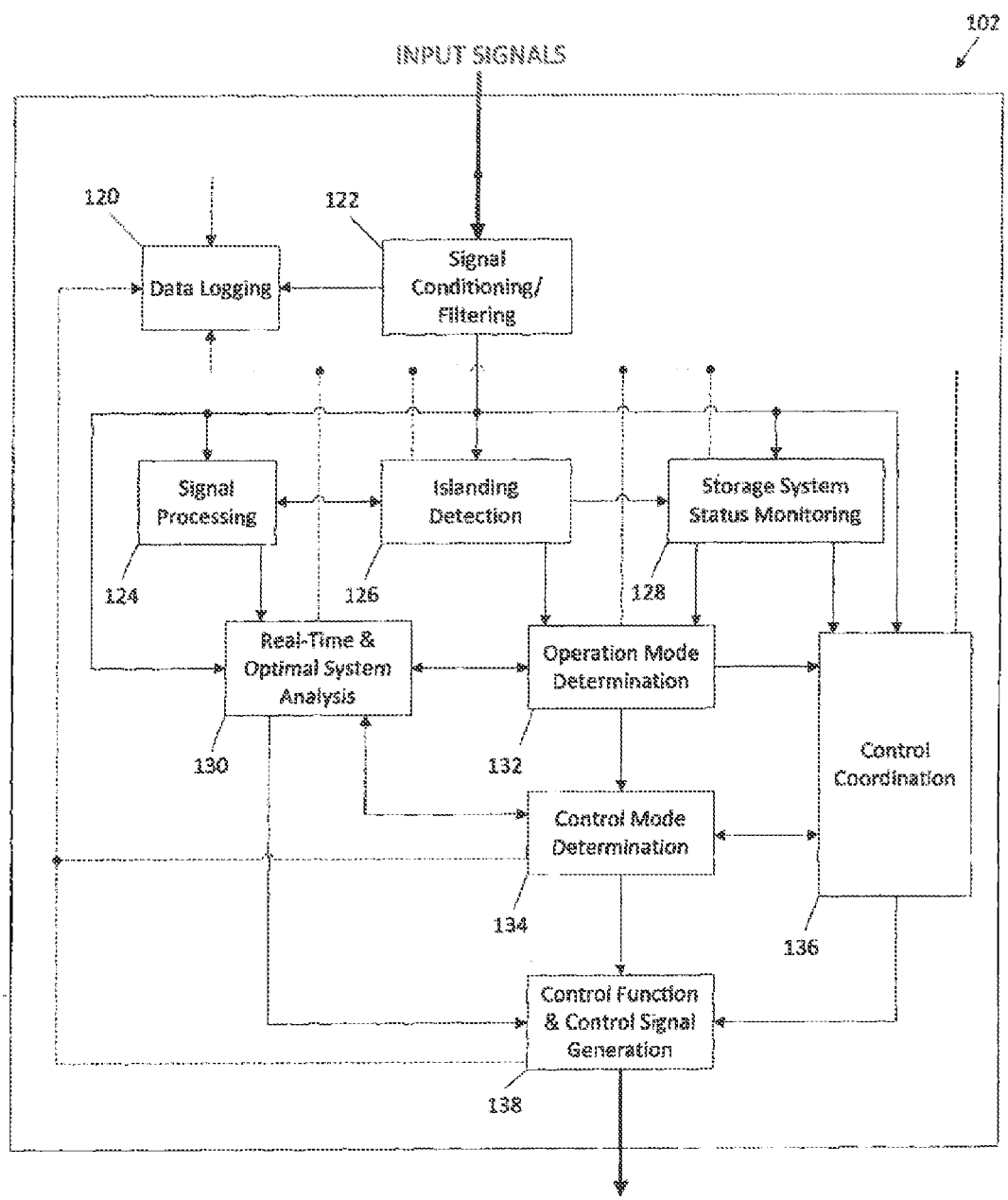
FIG. 2 is a block diagram of the control, protection and power management unit of FIG. 1.

Turning now to FIG. 2, the CPPM unit 102 is better illustrated. As can be seen, the CPPM unit 102 comprises a number of interconnected modules. In this embodiment, the interconnected modules include a data logging module 120, a signal conditioning/filtering module 122, a signal processing module 124, an islanding detection module 126, a storage system status monitoring module 128, a real-time and optimal system analysis module 130, an operation mode determination module 132, a control mode determination module 134, a control coordination module 136, and a control function and control signal generation module 138. As will be appreciated, modules 120 to 138 are implemented in a digital, analog, or digital/analog platform that includes at least one of a digital signal processor (DSP), a field-programmable gate array (FPGA), and a programmable logic controller (PLC).

The data logging module 120 in this embodiment is a general purpose computing device or other suitable processing device comprising, for example, a processing unit, system memory (volatile and/or non-volatile memory), other non-removable or removable memory (e.g., a hard disk drive, RAM, ROM, EEPROM, CD-ROM, DVD, flash memory, etc.) and a system bus coupling the various computing device components to the processing unit. The general purpose computing device may also comprise networking capabilities using Ethernet, WiFi, and/or other suitable network format, to enable connection to shared or remote drives, one or more networked computers, or other networked devices. The data logging module 120 stores measured data received from the power system 103 that is based on raw or specified measured results and stores processed measured results received from the signal conditioning/filtering module 122. The data logging module 120 also stores data generated by the islanding detection module 126, the storage system status monitoring module 128, the real-time and optimal system analysis module 130, the operation mode determination module 132, the control mode determination module 134, the control coordination module 136, and the control function and control signal generation module 138. Time-resolution of the stored data corresponding to each input signal to the data logging module 120 is determined based on user requirements and the type of information to be extracted from the stored data. In this embodiment, the data logging module 120 provides fast transient data as well steady-state captured data.

Input signals received by the CPPM unit 102 from the power system 103, local load 110, and the storage system 112 include data associated with instantaneous values, average values, root mean square (RMS) values, estimated values, logical data used for control, command, protection, diagnostics, and data logging at different time-frames. As will be appreciated, the input signals may be corrupted and/or distorted due to measurement and transmission errors and may include information that is not required by the CPPM unit 102, and thus may lead to confusion or may prolong the time required to execute the decision making process of the CPPM unit 102. As such, the signal conditioning/filtering module 122 provides filtering and signal conditioning of the input signals to eliminate parasitic and unwanted information.

The signal conditioning/filtering module 122 includes active and passive filters such as for example high-pass filters, low-pass filters, band-pass filters, notch filters, sliding time-windows and executes known signal conditioning methods, to retain the desired information contained in the input signals and to remove unwanted information from the input signals.

The signal processing module 124 comprises multiprocessor hardware and associated software modules for real-time and off-line signal processing. As will be appreciated, real-time signal processing is used for signals associated with real-time control and protection applications. In this embodiment, real-time signal processing is used for a number of applications such as for example to provide information for grid-synchronization of the storage system 112 through a phase-locked loop system; to transform abc-frame measured, calculated and/or estimated currents and voltages into a stationary, constant-speed, or variable speed qd0-based reference frame for developing instantaneous quadrature-axis current, voltage and active-reactive components to control power exchange between the storage system 112 and the power system 103; to extract dynamic symmetrical components of the abc-frame based current and voltage components for transformation into the qd0-based reference frame for dynamic balancing and/or other sequence frame-based control functions required by the transmission grid 104, distribution grid 105 or for load balancing through voltage, current, and/or power injection from the storage system 112 into the transmission grid 104 and/or the distribution grid 105; to extract data for calculation of control set-points for secondary and tertiary control actions such as in the islanded operation; and to eliminate current/voltage components such as double frequency, wherein the 120 Hz ripple of the storage interface 114 is eliminated at the DC side of the converter. As will be appreciated, the abc-frame signals received by the signal processing module 124 from the signal conditioning/filtering module 122 are transformed into sequence-frame components and/or qd0 components using known methodologies. However, depending on the degree of precision and the required speed of calculations, dedicated digital algorithms may be used in conjunction with a dedicated field-programmable gate array (FPGA) processor to achieve the required computational speed and efficiency within a desired degree of accuracy [see references 1-3]. The signal processing module 124 also processes information received from the islanding detection module 126 to compensate and account for the impact of the islanding detection module 126 on the current and voltage signals of the system which cannot be conditioned/filtered-out by the signal conditioning/filtering module 122 [see references 4-6].

Off-line signal processing is used for steady-state and quasi-steady state non-real-time applications that are used within the time frame required for power management and optimization of the power system 103. In this embodiment, off-line signal processing is used for the extraction of signals for sub-optimal and optimal system operation, allocation of resources, set-point adjustment, and loss minimization. The time frame for off-line signal processing depends on several factors such as for example communication speed, functionality requirements of the storage system 112, and degree of impact and significance of the storage system 112 response on the performance of the power system 103. As will be appreciated, the time frame may range from 10 milliseconds to several minutes. In this embodiment, the off-line signal processing method used by the CPPM module 102 uses known algorithms and implements these known algorithms on the signal processing module 124 [2-4].

The Islanding detection module 126 detects either separation of the storage system 112 and the local load 110 from the power system 103 or separation of the storage system 112, local load 110, transformer 108 and a portion of power system 103 from the rest of the power system 103. As will be appreciated, this separation may be due to planned events such as for example the manual opening of a switch or accidental events such as for example in the event of a fault and the resultant switching actions associated therewith.

A number of scenarios may be implemented during islanding. During one scenario, referred to as anti-islanding, the separation enables the storage system 112 to be disconnected from the rest of the power system 103 and shut down in an orderly and pre-specified manner. Once an event occurs that necessitates anti-islanding, the time-frame to execute anti-islanding is about 2 seconds.

Another scenario enables the storage system 112 to remain operational and function as an uninterruptible power supply (UPS) for the local load 110 during power system interruptions and/or emergency conditions. In another possible scenario, the storage system 112 remains operational and supplies power to the local load 110 and to a portion of the load of power system 103, downstream of the point of separation. In these two scenarios, the separation or islanding event is detected and used to retain acceptable operation of the islanded section during the islanding transients and subsequently, depending on generation and load capabilities within the island, through appropriate control actions. As will be appreciated, this requires fast islanding detection, for example within 10 milliseconds (depending on the characteristics and parameters of the load, generation and/or storage units within the island) to prevent island instability, unwanted power quality issues due to frequency and/or voltage changes, and island collapse.

The islanding detection module 126 receives signals from the signal conditioning/filtering module 122 and the signal processing module 124 to identify the islanding event and its type and to discriminate between an islanding process and transients due to planned switching events and temporary faults. The islanding detection module 126 processes the received signals to determine the islanding of the storage system 112 and local load 110 or the islanding of the storage system 112, local load 110, transformer 108 and portion of the power system 103 [see references 7-10].

If, based on the utility requirements, the islanding detection module 126 detects anti-islanding, then a known passive islanding detection method, such as under/over frequency and/or under/over voltage method, phase jump detection method, power factor detection method, or harmonic detection method is adopted and the corresponding digital algorithms are implemented by the CPPM unit 102. In this embodiment, a combination of under/over voltage and under/over frequency passive islanding detection methods are used for the anti-islanding action, as a back-up, and an active islanding detection method such as for example active frequency drift, Sandia Frequency Shift or Sandia Voltage shift is incorporated to retain operation of the island subsequent to an islanding event. As will be appreciated, the active islanding detection method is faster than the passive islanding detection method and thus the passive islanding detection method is activated in the event that the active method fails to operate.

In this embodiment, the main function of the islanding detection module 126 is based on active-islanding detection. The islanding detection module 126 injects a small-amplitude, low-frequency current signal through the interface unit 114 and the transformer 108 into the power system 103. The current signal is injected upstream of the storage system 112 and the islanding detection module 126 monitors the signature of the injected current signal at the terminal of local load 110 and/or upstream of the local load 110. Based on the impact of the islanding event on the properties of the injected current signal, the islanding detection module 126 identifies the event within the desired time-frame. As will be appreciated, rather than injecting the current signal through the interface unit 114, the current signal may be injected through use of auxiliary equipment (not shown) installed outside the storage system 112, either upstream or downstream of the transformer 108.

The islanding detection module 126 comprises an off-line trained neural network-based algorithm [see references 11-15] used to increase the degree of accuracy and precision of islanding detection. As will be appreciated, the neural network-based algorithm is specific to the implemented islanding detection strategy. The neural network-based algorithm may be re-trained when the local load 110, the utility load 106 or the distribution grid 105 are subject to permanent and/or significant changes in magnitude and electrical characteristics.

The storage system status monitoring module 128 receives signals from the battery management system (BMS) of the storage medium 116 through the signal conditioning/filtering module 122. The signals provide the state of the charge, temperature, current, voltage and the status of switches associated with each battery module and or string within the storage medium 116 and associated with the overall battery system. The storage system status monitoring module 128 receives signals from the signal conditioning/ filtering module 122 and the signal processing module 124 to identify the status [see references 16-20] of the battery system in terms of magnitude and direction of power exchange and current flow between the storage medium 116 and the rest of the smart grid 100.

The storage system status monitoring module 128 processes signals received from the signal conditioning/filtering module 122, signal processing module 124 and islanding detection module 126 to determine if specific protection/safety measures need to be activated, such as for example anti-islanding. The storage system status monitoring module 128 processes signals received from the signal processing module 124 to identify unbalanced conditions of the local load 110 and/or the power system 103, and if an unbalanced condition is identified, the storage system status monitoring module 128 activates measures to enable operation of the storage medium 116 when subject to distorted DC signals. As such, the storage system 112 is able to compensate and/or withstand the impact of unbalanced operation [see references 21-24]. The storage system status monitoring module 128 also identifies the presence and the degree of harmonic distortion imposed on the storage system module 112 [see references 25-27].

The primary function of the real-time and optimal system analysis module 130 is to determine control set points (reference values) for the storage system module 112 subsequent to a change in the power system 103, a change in the local load 110, or a change in the operational mode or limit conditions of the storage system 112 [see references 28-30]. The real-time and optimal system analysis module 130 comprises power flow analysis routines, state estimation routines, load forecast routines and stores historical data such as load and/or voltage variation patterns. Depending on the signals received from the operation mode determination module 132, the real-time and optimal analysis module 130 actives routines for the islanded mode of operation or for the grid-connected mode of operation [see references 31-33]. As discussed above, during islanding, the island is either composed of the storage system module 112 and the local load 110 or the storage system 112, local load 110, transformer 108 and a portion of the power system 103 [see references 31-35]. In the event that the island only includes the storage system 112 and the local load 110, the real-time and optimal system analysis module 130 remains inactive and thus the operational decisions are made by the control mode determination module 134. In the event that the island includes the storage system 112, the local load 110, transformer 108 and a portion of the power system 103, the real-time and optimal system analysis module 130 performs power flow analysis. The power flow analysis is a real-time analysis which is performed approximately 20 to 100 milliseconds after islanding detection. The real-time analysis provides voltage and power set points for the control of voltage and/or power. As will be appreciated, the real-time analysis' primary function is to maintain a viable and stable operating condition for the islanded system. The stability of the overall power system 103 is maintained by communicating the non-optimal steady-state values to controllers associated therewith and re-adjusting their set points so they can respond to system changes based on the disturbance.

The effect of electrical imbalance on the set-points is accounted for by adopting a sequence-frame based power flow analysis. Subsequent to an initial power flow analysis, based on the available measured signals from signal processing module 124 and information from the operation mode determination module 132, the real-time and optimal system analysis module 130 performs a state estimation and then carries out an optimal power flow analysis to optimize the operation of the island [see references 36-41]. As will be appreciated, this analysis accommodates various generation scenarios, demand-side integration, market signals and optimizes the island operation based on pre-specified criteria such as losses in the system, efficiency of the storage system 112, minimum generation cost, or any combination thereof.

When the storage system module 112 is in the grid-connected mode of operation, depending on the utility grid requirements, two operational modes are possible and are determined by the operation mode determination module 132. One operational mode is set in the event that one or more distributed generation units positioned in close electrical proximity of the storage system module 112 are conditioned to operate in a power injection mode or in a maximum-power-point tracking (MPPT) mode. The other operational mode is set in the event that the distributed generation units positioned in close electrical proximity of the storage system module 112 are conditioned to provide volt/VAR/W control or to operate in MPPT mode. In either mode, the real-time and optimal system analysis module 130 provides real-time power flow and optimal power flow for the operation of the storage system 122.

The operation mode determination module 132 receives signals from the islanding detection module 126, the storage system status monitoring module 128, and the operation mode determination module 132 and processes the received signals to determine the operation mode for the storage system 112. The received signals are processed taking into consideration the previous operating condition of the storage system 112, the newly determined condition received from the optimal system analysis module 130 and by calculating rate changes of parameters, such as for example voltage and frequency.

In the grid-connected condition, depending on the control strategies of other distributed generation units and/or presence of demand-side integration [see references 42-46], the generation units can be either in power-injection control or volt/VAR/W control. After determination of the operational mode by the operation mode determination module 132, a signal is communicated to the real-time and optimal system analysis module 130 to calculate the subsequent optimal point. If the real-time and optimal system analysis module 130 cannot determine a viable solution, then the signal is processed to determine another viable operational mode.

The control mode determination module 134 receives signals from the operation mode determination module 132 and a verification signal from the real-time and optimal system analysis module 130 regarding the viability of the newly determined control mode. For each viable operational mode determined by the operation mode determination module 132, there may be multiple control modes of operation dependent on the storage system status, grid-connected or islanded operational conditions, reactive power injection carried out based on different control modules, voltage control, power factor correction, and reactive power export. For example: 1) in the event the operation of the storage system module 112 is to change from a grid-connected scenario to an islanded scenario, or vice versa, the control mode determination module 134 provides transition between controllers associated with the power system 103 to enable the required control functions; and 2) in the event where the operational mode of the storage system 112 and the local load 110 is to change from distribution grid connected mode to the islanded mode, from the islanded mode to the distribution grid connected mode, from the transmission grid connected mode to the distribution grid connected mode, or from the distribution grid connected mode to the transmission grid connected mode, the control mode determination module 134 provides transition between controllers of storage system 112 to enable the required control functions. In the event major subsystems such as for example generation units are energized or de-energized, the control mode determination module 134 provides transition between controllers providing the associated control functions.

As will be appreciated, if the distribution grid 105 is equipped with a central distribution system, energy/power management system and supervisory control, the control function of the storage system module 112 must be harmonized with the control function of any distributed generation unit, distributed storage unit, and controllable load connected to the distribution grid. In the event that the control coordination module 136 communicates a signal to the control mode determination module 134 identifying the external requirements of the distribution grid 150, a check is performed to ensure that the storage system 112 is in compliance with the external requirements of the distribution grid 105.

If the distribution grid 105 comprises multiple distributed generation units, distributed electrical energy storage units, and controllable loads, it will be appreciated that there may be requirements/limitations for pre-determined power exchange with the transmission grid 104, and/or voltage/frequency regulations at the point of coupling with the transmission grid 104. The control coordination module 136 provides control coordination between the operation of the storage system 112 and other storage systems, controllable loads, distributed generation units, and the substation of the power system 103 up-stream to the storage system 112. The control coordination module 136 carries out the coordination in time frames as required by the time response of primary controls, secondary controls, tertiary controls and market requirements. In this embodiment, the control coordination is based on power-frequency and voltage-VAR droop characteristics implemented at each control unit associated with the power system 103. However, as will be appreciated, the control coordination can be based on other criteria, such as for example communication-based coordination utilizing adaptive robust control approaches for the energy storage system 112 and other controllable subsystems.

In the event that the island only includes the storage system 112 and the local load 110, the control coordination module 136 is inactive and thus the operational decisions are made by the control mode determination module 134.

The control function and control signal generation module 138 comprises algorithms [see references 47-50] that provide switching patterns for the storage interface 114 to enable control functions and operation of the storage medium 112 based on the outputs of the real-time and optimal system analysis module 130, the control mode determination module 134 and the islanding detection module 126. In this embodiment, the control function and control signal generation module 138 utilizes a sinusoidal pulse-width-modulation (PWM) method [see references 51-54].

Figure 3:
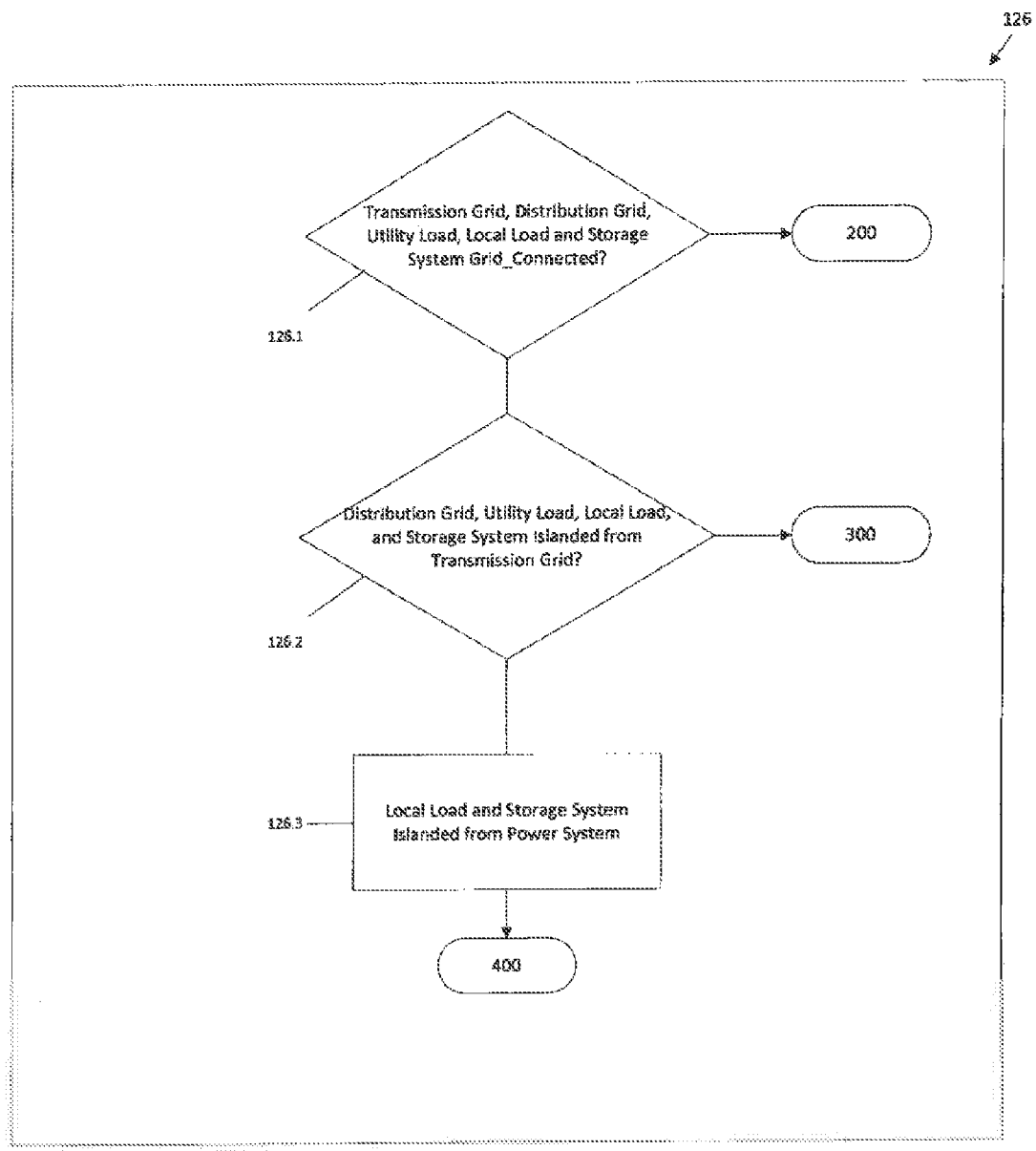
FIG. 3 is a flowchart showing the operation of an islanding detection module forming part of the control, protection and power management unit of FIG. 2.

Turning now to FIG. 3, a flowchart showing the operation of the islanding detection module 126 is shown. If the transmission grid 104, distribution grid 105, utility load 106, local load 110 and storage system 112 are connected (step 126.1), the islanding detection module 136 sends a signal 200 to the storage system status monitoring module 128.

If the transmission grid 104, distribution grid 105, utility load 106, local load 110 and storage system 112 are not connected (step 126.1), the islanding detection module 126 determines if the distribution grid 105, utility load 106, local load 110 and storage system 112 are islanded from the transmission grid 104 (step 126.2). If so, the islanding detection module 136 sends a signal 300 to the storage system status monitoring module 128

If the distribution grid 105, utility load 106, local load 110 and storage system 112 are not islanded from the transmission grid 104, the islanding detection module 126 determines that the local load and storage system are islanded from the power system 103 (step 126.3) and thus the islanding detection module 126 sends a signal 400 to the storage system status monitoring module 128.

Figure 4A:
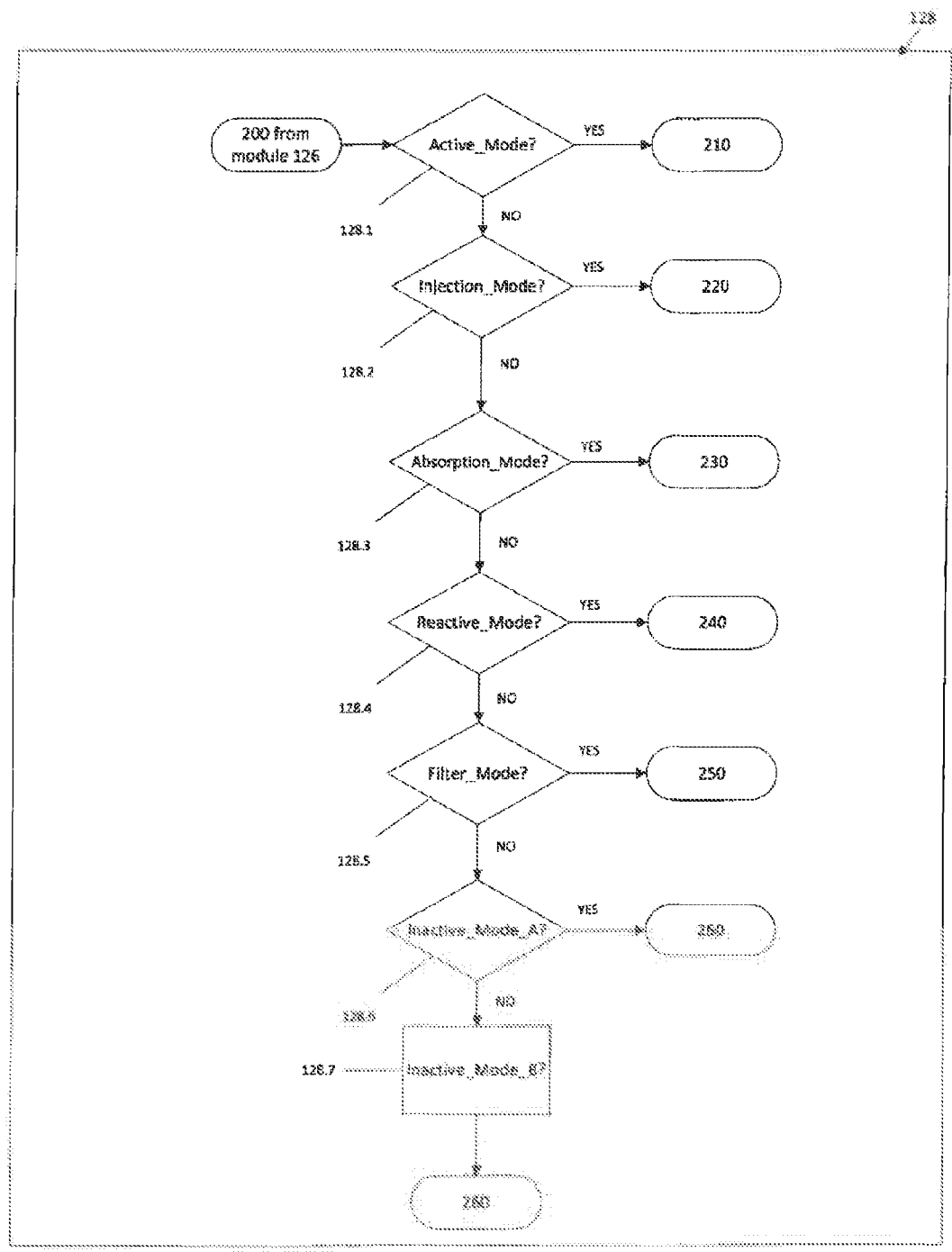
FIGS. 4A, 4B and 4C are flowcharts showing the operation of a storage system status and monitoring module forming part of the control, protection and power management unit of FIG. 2.
Figure 4B:
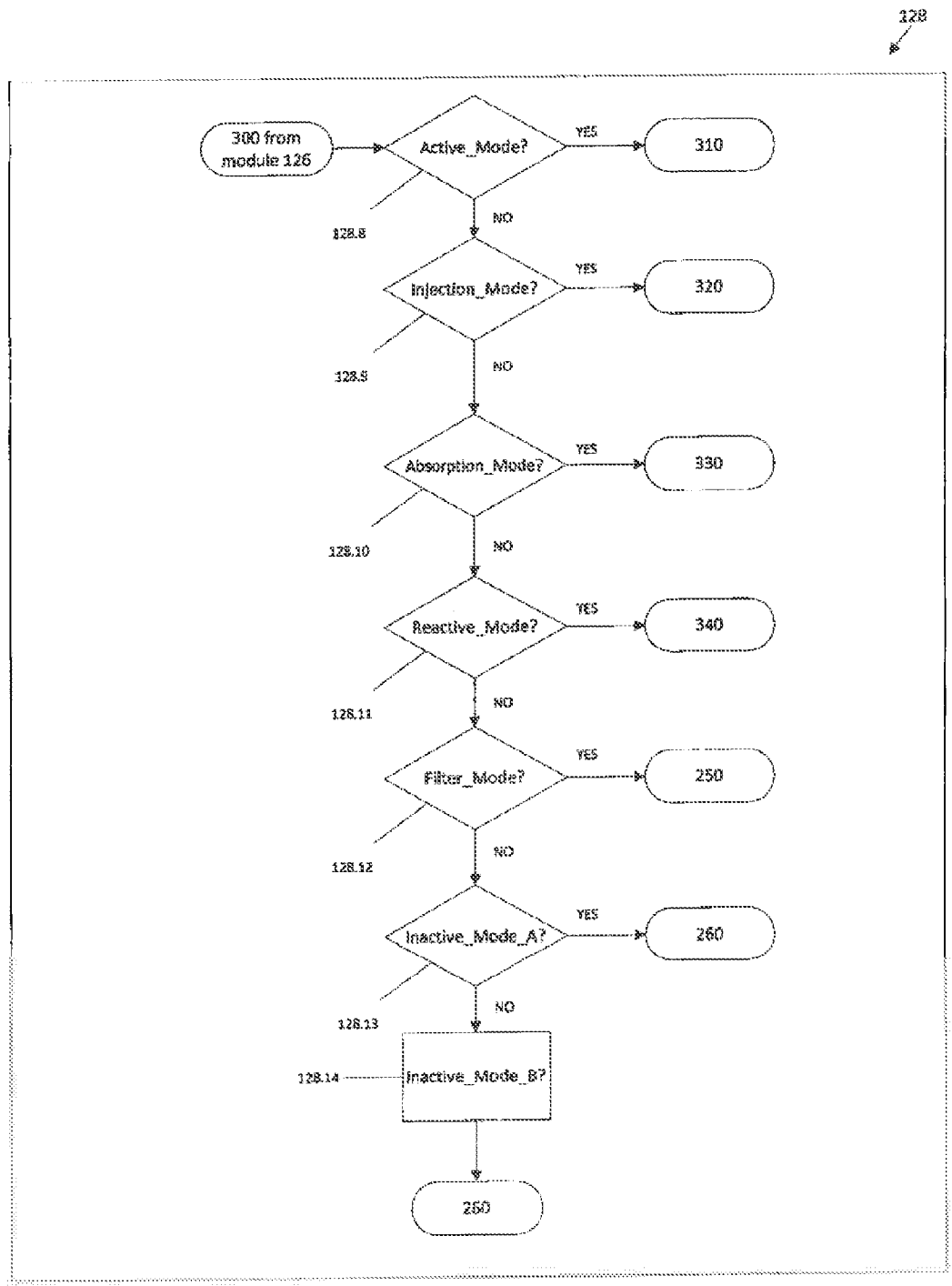
Figure 4C:
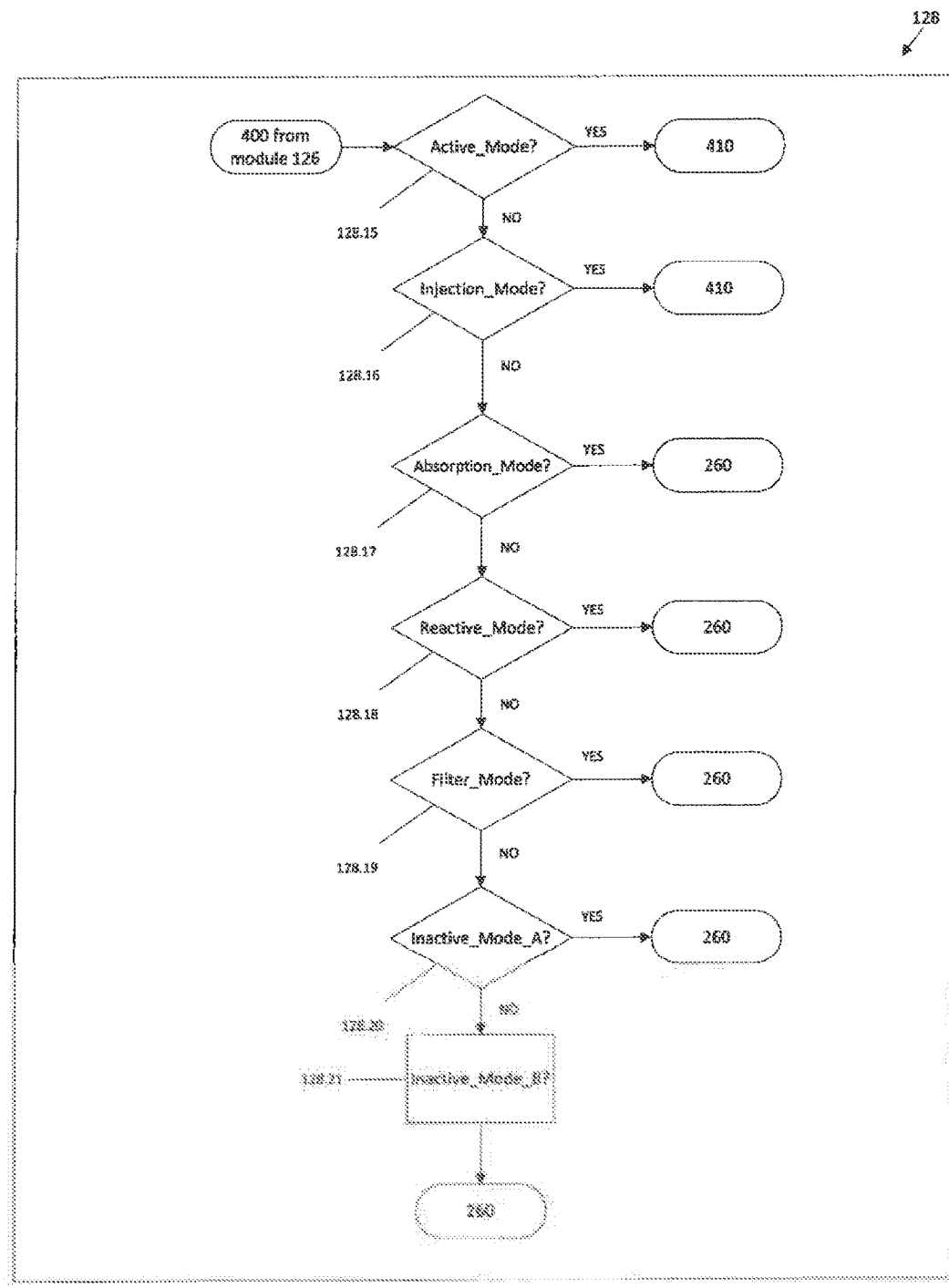

Turning now to FIGS. 4A, 4B and 4C, flowcharts showing the operation of the storage system status monitoring module 128 are illustrated. If signal 200 is received from the islanding detection module 126, the storage system status monitoring module 128 checks the mode of the storage system 112. If the storage system 112 is operating in the active_mode (step 128.1), the storage system status monitoring module 128 sends a signal 210 to the operation mode determination module 132. If the storage system 112 is not operating in the active_mode, the storage system status monitoring module 128 determines if the storage system 112 is operating in the injection_mode (step 128.2) and if so, the storage system status monitoring module 128 sends a signal 220 to the operation mode determination module 132. If the storage system 112 is not operating in the injection_mode, the storage system status monitoring module 128 determines if the storage system 112 is operating in the absorption_mode (step 128.3) and if so, the storage system status monitoring module 128 sends a signal 230 to the operation mode determination module 132. If the storage system 112 is not operating in the absorption_mode, the storage system status monitoring module 128 determines if the storage system 112 is operating in the reactive_mode (step 128.4) and if so, the storage system status monitoring module 128 sends a signal 240 to the operation mode determination module 132. If the storage system 112 is not operating in the reactive_mode, the storage system status monitoring module 128 determines if the storage system 112 is operating in the filter_mode (step 128.5) and if so, the storage system status monitoring module 128 sends a signal 250 to the operation mode determination module 132. If the storage system 112 is not operating in the filter_mode, the storage system status monitoring module 128 determines if the storage system 112 is operating in the inactive_mode_A (step 128.6) and if so, the storage system status monitoring module 128 sends a signal 260 to the operation mode determination module 132. If the storage system 112 is not operating in the inactive_mode_A, the storage system status monitoring module 128 determines if the storage system 112 is operating in the inactive_mode_B (step 128.7) and if so, the storage system status monitoring module 128سends a signal 260 to the operation mode determination module 132.

If a signal 300 is received from the islanding detection module 126, the storage system status monitoring module 128 checks the mode of the storage system 112. If the storage system 112 is operating in the active_mode (step 128.8), the storage system status monitoring module 128 sends a signal 310 to the operation mode determination module 132. If the storage system 112 is not operating in the active_mode, the storage system status monitoring module 128 determines if the storage system 112 is operating in the injection_mode (step 128.9) and if so, the storage system status monitoring module 128 sends a signal 320 to the operation mode determination module 132. If the storage system 112 is not operating in the injection_mode, the storage system status monitoring module 128 determines if the storage system 112 is operating in the absorption_mode (step 128.10) and if so, the storage system status monitoring module 128 sends a signal 330 to the operation mode determination module 132. If the storage system 112 is not operating in the absorption_mode, the storage system status monitoring module 128 determines if the storage system 112 is operating in the reactive_mode (step 128.11) and if so, the storage system status monitoring module 128 sends a signal 340 to the operation mode determination module 132. If the storage system 112 is not operating in the reactive_mode, the storage system status monitoring module 128 determines if the storage system 112 is operating in the filter_mode (step 128.12) and if so, the storage system status monitoring module 128 sends a signal 250 to the operation mode determination module 132. If the storage system 112 is not operating in the filter_mode, the storage system status monitoring module 128 determines if the storage system 112 is operating in the inactive_mode_A (step 128.13) and if so, the storage system status monitoring module 128 sends a signal 260 to the operation mode determination module 132. If the storage system 112 is not operating in the inactive_mode_A, the storage system status monitoring module 128 determines if the storage system 112 is operating in the inactive_mode_B (step 128.14) and if so, the storage system status monitoring module 128 sends a signal 260 to the operation mode determination module 132.

If a signal 400 is received from the islanding detection module 126, the storage system status monitoring module 128 checks the mode of the storage system 112. If the storage system 112 is operating in the active_mode (step 128.15), the storage system status monitoring module 128 sends a signal 410 to the operation mode determination module 132. If the storage system 112 is not operating in the active_mode, the storage system status monitoring module 128 determines if the storage system 112 is operating in the injection_mode (step 128.16) and if so, the storage system status monitoring module 128 sends a signal 410 to the operation mode determination module 132. If the storage system 112 is not operating in the injection_mode, the storage system status monitoring module 128 determines if the storage system 112 is operating in the absorption_mode (step 128.17) and if so, the storage system status monitoring module 128 sends a signal 260 to the operation mode determination module 132. If the storage system 112 is not operating in the absorption_mode, the storage system status monitoring module 128 determines if the storage system 112 is operating in the reactive_mode (step 128.18) and if so, the storage system status monitoring module 128 sends a signal 260 to the operation mode determination module 132. If the storage system 112 is not operating in the reactive_mode, the storage system status monitoring module 128 determines if the storage system 112 is operating in the filter_mode (step 128.19) and if so, the storage system status monitoring module 128 sends a signal 260 to the operation mode determination module 132. If the storage system 112 is not operating in the filter_mode, the storage system status monitoring module 128 determines if the storage system 112 is operating in inactive_mode_A (step 128.20) and if so, the storage system status monitoring module 128 sends a signal 260 to the operation mode determination module 132. If the storage system 112 is not operating in the inactive_mode_A, the storage system status monitoring module 128 determines if the storage system 112 is operating in the inactive_mode_B (step 128.21) and if so, the storage system status monitoring module 128 sends a signal 260 to the operation mode determination module 132.

Figure 5:
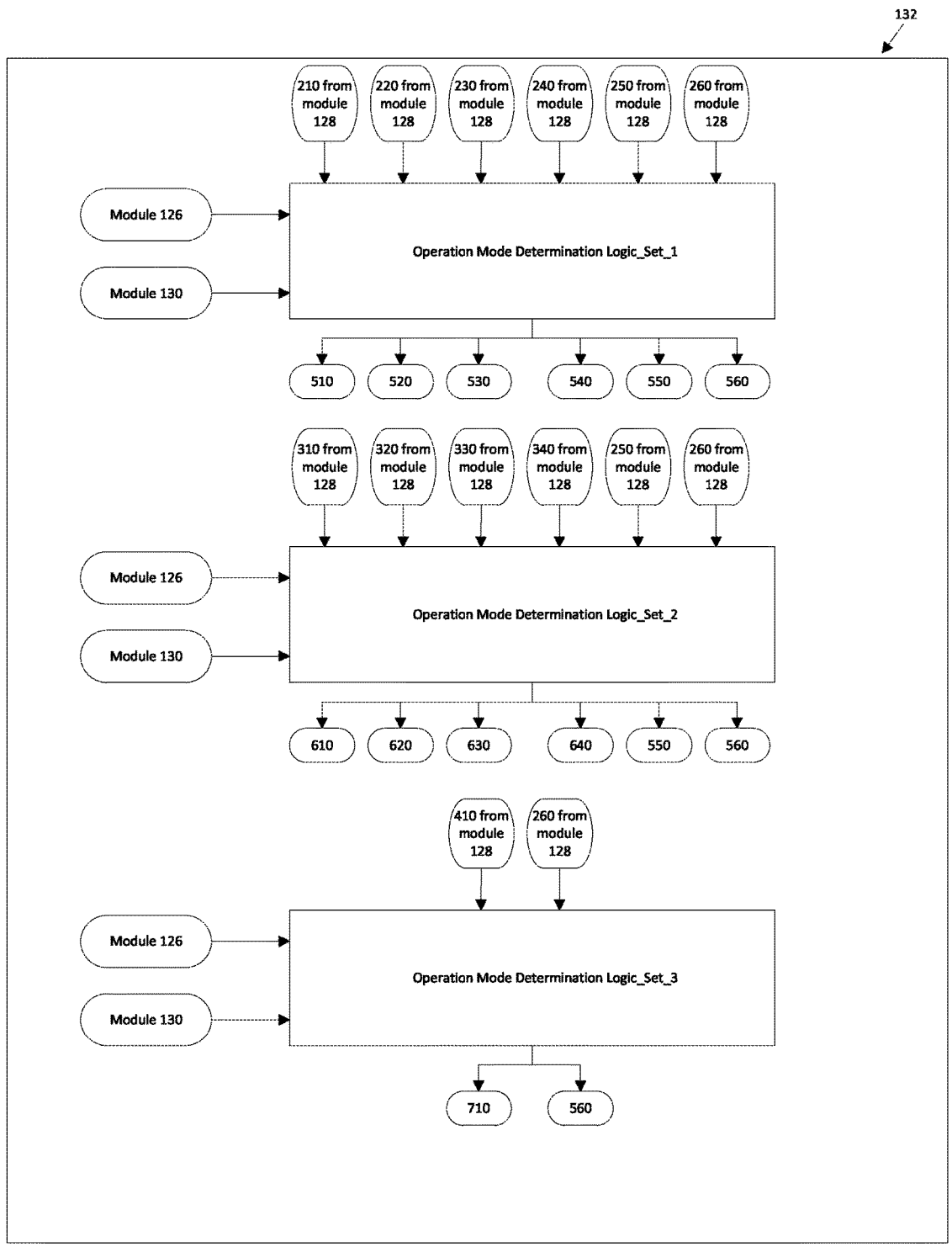
FIG. 5 is a flowchart showing the operation of an operation mode determination module forming part of the control, protection and power management unit of FIG. 2.

Turning now to FIG. 5, a flowchart showing the operation of the operation mode determination module 132 is illustrated. As described above, the operation mode determination module 132 receives signals from the islanding detection module 126, the real-time and optimal system status module 130, and the storage system status monitoring module 128.

In the event the operation mode determination module 132 receives signal 200 from the islanding detection module 126 and receives signal 210 from the storage system status monitoring module 128, the operation mode determination module 132 processes the signals according to operation mode determination logic_set_1 and outputs a signal 510 to the control mode determination module 134. In the event the operation mode determination module 132 receives signal 200 from the islanding detection module 126 and receives signal 220 from the storage system status monitoring module 128, the operation mode determination module 132 processes the signals according to operation mode determination logic_set_1 and outputs a signal 520 to the control mode determination module 134. In the event the operation mode determination module 132 receives signal 200 from the islanding detection module 126 and receives signal 230 from the storage system status monitoring module 128, the operation mode determination module 132 processes the signals according to operation mode determination logic_set_1 and outputs a signal 530 to the control mode determination module 134. In the event the operation mode determination module 132 receives signal 200 from the islanding detection module 126 and receives signal 240 from the storage system status monitoring module 128, operation mode determination module 132 processes the signals according to operation mode determination logic_set_1 and outputs a signal 540 to the control mode determination module 134. In the event the operation mode determination module 132 receives signal 200 from the islanding detection module 126 and receives signal 250 from the storage system status monitoring module 128, operation mode determination module 132 processes the signals according to operation mode determination logic_set_1 and outputs a signal 550 to the control mode determination module 134. In the event the operation mode determination module 132 receives signal 200 from the islanding detection module 126 and receives signal 260 from the storage system status monitoring module 128, the operation mode determination module 132 processes the signals according to operation mode determination logic_set_1 and outputs a signal 560 to the control mode determination module 134.

In the event the operation mode determination module 132 receives signal 300 from the islanding detection module 126 and receives signal 310 from the storage system status monitoring module 128, operation mode determination module 132 processes the signals according to operation mode determination logic_set_2 and outputs a signal 610 to the control mode determination module 134. In the event the operation mode determination module 132 receives signal 300 from the islanding detection module 126 and receives signal 320 from the storage system status monitoring module 128, the operation mode determination module 132 processes the signals according to operation mode determination logic_set_2 and outputs a signal 620 to the control mode determination module 134. In the event the operation mode determination module 132 receives signal 300 from the islanding detection module 126 and receives signal 330 from the storage system status monitoring module 128, operation mode determination module 132 processes the signals according to operation mode determination logic- _set_2 and outputs a signal 630 to the control mode determination module 134. In the event the operation mode determination module 132 receives signal 300 from the islanding detection module 126 and receives signal 340 from the storage system status monitoring module 128, operation mode determination module 132 processes the signals according to operation mode determination logic_set_2 and outputs signal 640 to the control mode determination module 134. In the event the operation mode determination module 132 receives signal 300 from the islanding detection module 126 and receives signal 250 from the storage system status monitoring module 128, operation mode determination module 132 processes the signals according to operation mode determination logic_set_2 and outputs a signal 550 to the control mode determination module 134. In the event the operation mode determination module 132 receives signal 300 from the islanding detection module 126 and receives signal 260 from the storage system status monitoring module 128, operation mode determination module 132 processes the signals according to operation mode determination logic_set_2 and outputs a signal 560 to the control mode determination module 134.

In the event the operation mode determination module 132 receives signal 400 from the islanding detection module 126 and receives signal 410 from the storage system status monitoring module 128, operation mode determination module 132 processes the signals according to operation mode determination logic_set_3 and outputs a signal 710 to the control mode determination module 134. In the event the operation mode determination module 132 receives signal 400 from the islanding detection module 126 and receives signal 260 from the storage system status monitoring module 128, operation mode determination module 132 processes the signals according to operation mode determination logic_set_3 and outputs a signal 560 to the control mode determination module 134.

Figure 6A:
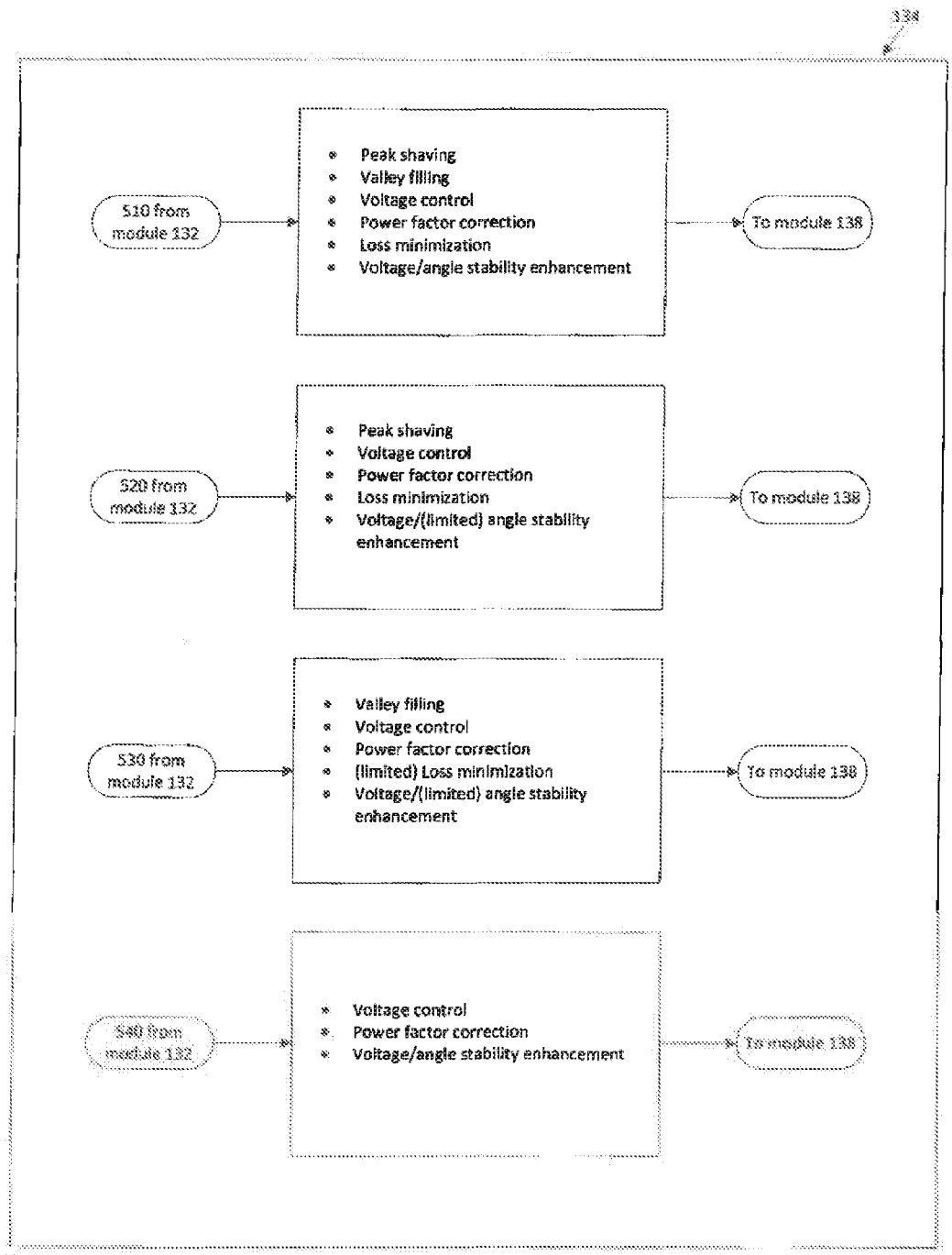
FIGS. 6A, 6B and 6C are flowcharts showing the operation of a control mode determination module forming part of the control, protection and power management unit of FIG. 2.
Figure 6B:
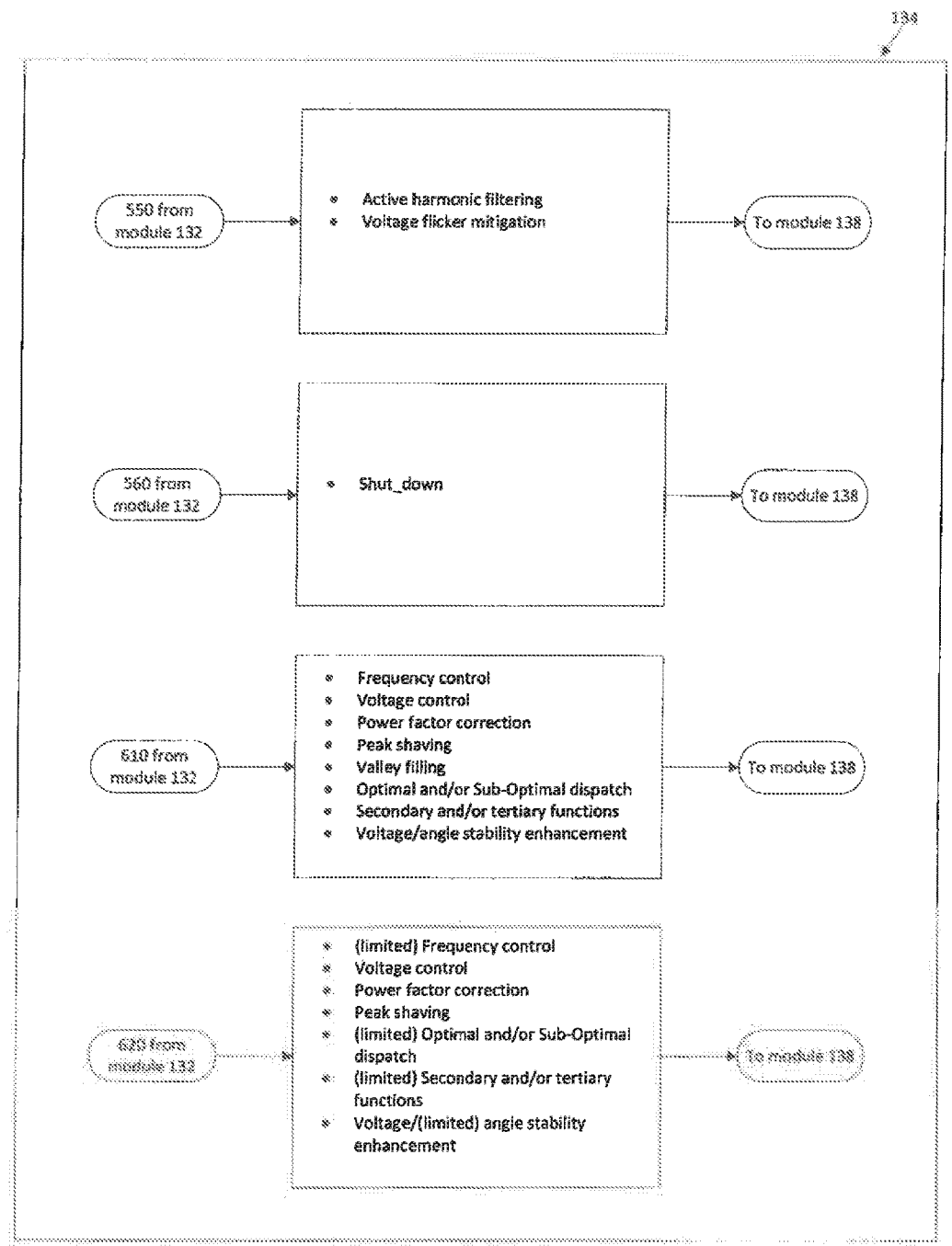
Figure 6C:
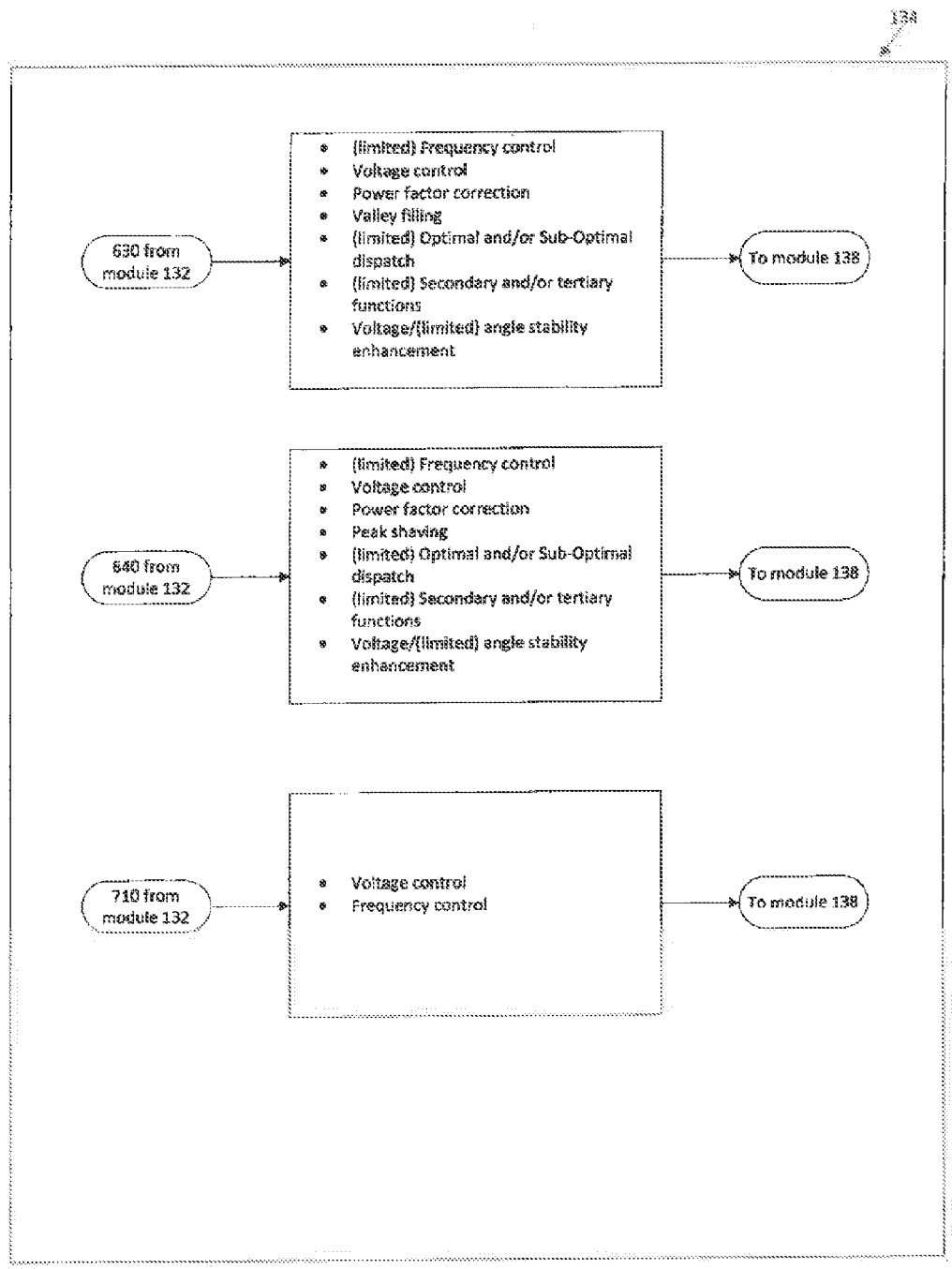

Turning now to FIGS. 6A, 6B and 6C, flowcharts showing the operation of the control mode determination module 134 are illustrated. As described above, the control mode determination module 134 receives signals from the operation mode determination module 132, control coordination module 136, and real-time and optimal system analysis module 130.

In the event that the control mode determination module 134 receives signal 510 from operation mode determination module 132, the control mode determination module 134 provides peak shaving, valley filing, voltage control, power factor correction, loss minimization and voltage/angle stability enhancement and provides the associated signals to the control function and control signal generation module 138 to be communicated to the storage interface 114.

In the event that the control mode determination module 134 receives signal 520 from operation mode determination module 132, the control mode determination module 134 provides peak shaving, voltage control, power factor correction, loss minimization, voltage/(limited) angle stability enhancement and provides the associated signals to the control function and control signal generation module 138 to be communicated to the storage interface 114.

In the event that the control mode determination module 134 receives signal 530 from operation mode determination module 132, the control mode determination module 134 provides valley filling, voltage control, power factor correction, (limited) loss minimization, and voltage/(limited) angle stability enhancement and provides the associated signals to the control function and control signal generation module 138 to be communicated to the storage interface 114.

In the event that the control mode determination module 134 receives signal 540 from operation mode determination module 132, the control mode determination module 134 provides voltage control, power factor correction and voltage/angle stability enhancement and provides the associated signals to the control function and control signal generation module 138 to be communicated to the storage interface 114.

In the event that the control mode determination module 134 receives signal 550 from operation mode determination module 132, the control mode determination module 134 provides active harmonic filtering and voltage flicker mitigation and provides the associated signals to the control function and control signal generation module 138 to be communicated to the storage interface 114.

In the event that the control determination module 134 receives signal 560 from operation mode determination module 132, the control mode determination module 134 provides a shutdown signal to the control function and control signal generation module 138 to be communicated to the storage interface 114.

In the event that the control determination module 134 receives signal 610 from operation mode determination module 132, the control mode determination module 134 provides frequency control, voltage control, power factor correction, peak shaving, valley filling, optimal and/or sub-optimal dispatch, secondary and/or tertiary functions, and voltage/angle stability enhancement and provides the associated signals to the control function and control signal generation module 138 to be communicated to the storage interface 114.

In the event that the control determination module 134 receives signal 620 from operation mode determination module 132, the control mode determination module 134 provides (limited) frequency control, voltage control, power factor correction, peak shaving, (limited) optimal and/or sub-optimal dispatch, (limited) secondary and/or tertiary functions, and voltage/(limited) angle stability enhancement and provides the associated signals to the control function and control signal generation module 138 to be communicated to the storage interface 114.

In the event that the control determination module 134 receives signal 630 from operation mode determination module 132, the control mode determination module 134 provides (limited) frequency control, voltage control, power factor correction, valley filling, (limited) optimal and/or sub-optimal dispatch, (limited) secondary and/or tertiary functions, and voltage/(limited) angle stability enhancement and provides the associated signals to the control function and control signal generation module 138 to be communicated to the storage interface 114.

In the event that the control determination module 134 receives signal 640 from operation mode determination module 132, the control mode determination module 134 provides (limited) frequency control, voltage control, power factor correction, peak shaving, (limited) optimal and/or sub-optimal dispatch, (limited) secondary and/or tertiary functions, and voltage/(limited) angle stability enhancement and provides the associated signals to the control function and control signal generation module 138 to be communicated to the storage interface 114.

In the event that the control determination module 134 receives signal 710 from operation mode determination module 132, the control mode determination module 134 provides voltage control and frequency control and provides the associated signals to the control function and control signal generation module 138 to be communicated to the storage interface 114.

Turning now to FIGS. 7A to 7F, an exemplary method executed by the CPPM unit 102 is shown and is generally identified by reference numeral 800. Prior to the execution of method 800, it is assumed that the storage system 112 is grid connected and that a disturbance has occurred in the power system 103 upstream of the storage system 112 and the local load 110. In this example, the disturbance is of a type which requires the storage system 112 and the local load 110 to island from the rest of the system. During method 800, the CPPM unit 102 detects islanding, sends the appropriate control signals to the local load 110 and the storage system 112, changes the mode of the storage system 112 to one of the active_mode and the injection_mode, such that the storage system provides voltage/frequency (V/F) control, and, depending on the status of the storage system 112 and the local load 110, sheds some load.

Figure 7A:
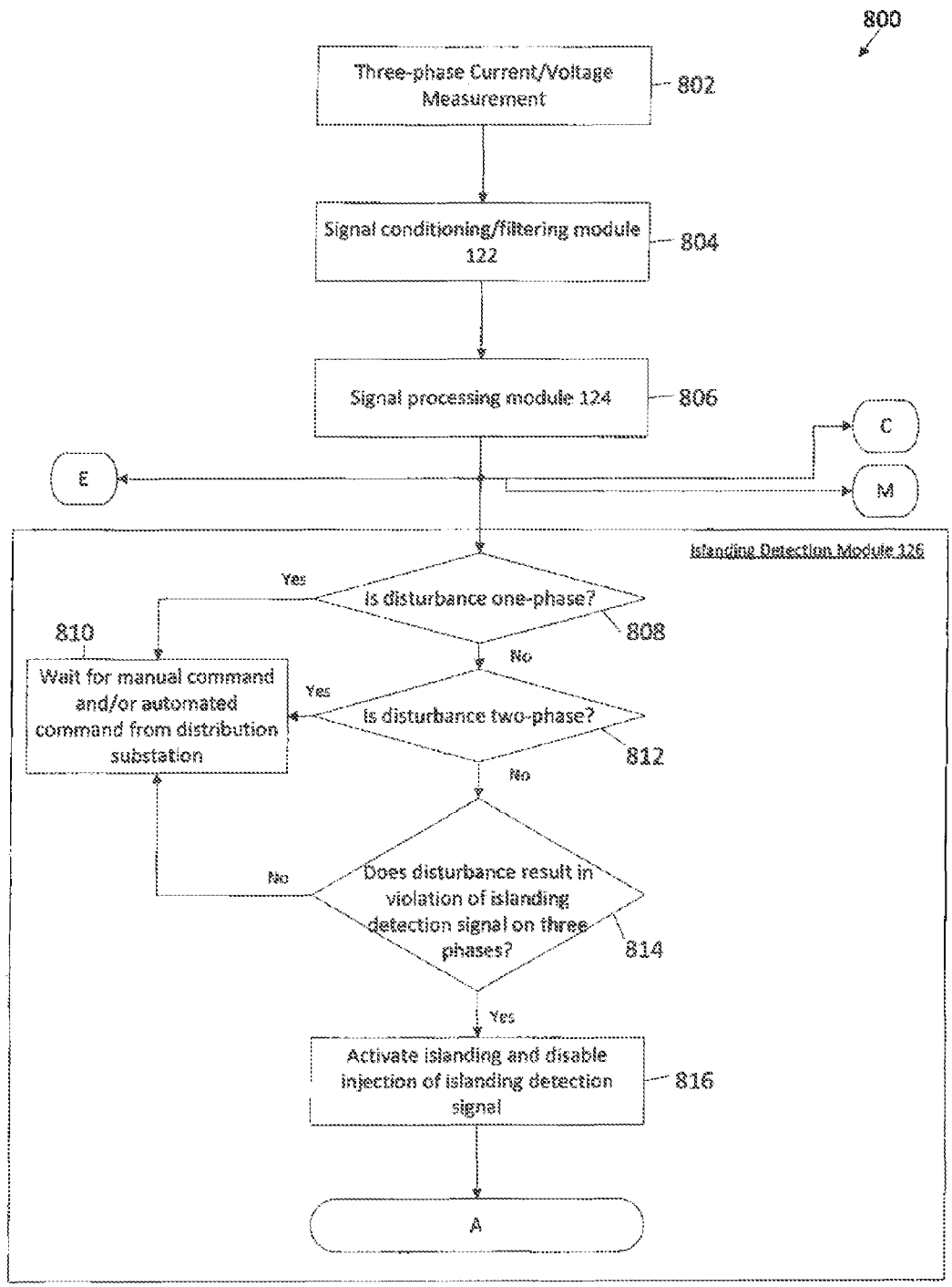
FIGS. 7A, 7B, 7C, 7D, 7E and 7F are flowcharts showing an exemplary method executed by the control, protection and power management unit of FIG. 2.

As can be seen in FIG. 7A, the CPPM unit 102 receives a signal indicating a three-phase current/voltage measurement (step 802). The received signal is filtered by the signal conditioning/filtering module 122 (step 804) and is processed by the signal processing module 124 (step 806). The signal processing module 124 communicates the processed signal to the islanding detection module 126, the real-time and optimal system analysis module 130, the control coordination module 136 and the storage system status monitoring module 128.

The islanding detection module 126 performs a check to determine if the disturbance is single phase (step 808) and if so, the islanding detection module 126 waits for a manual or automated command from the distribution substation (step 810). If the disturbance is not single phase, a check is performed to determine if the disturbance is two-phase (step 812) and if so, the islanding detection module 126 waits for a manual or automated command from the distribution substation (step 810). If the disturbance is not two-phase, a check is performed to determine if the disturbance results in the violation of islanding detection on three phases (step 814), and if it does not, the islanding detection module 126 waits for a manual or automated command from the distribution substation (step 810). If the disturbance results in the violation of islanding detection on three phases, islanding is activated, the injection of the islanding detection signal is disabled (step 816) and a signal is sent to the operational mode determination module 132.

Figure 7B:
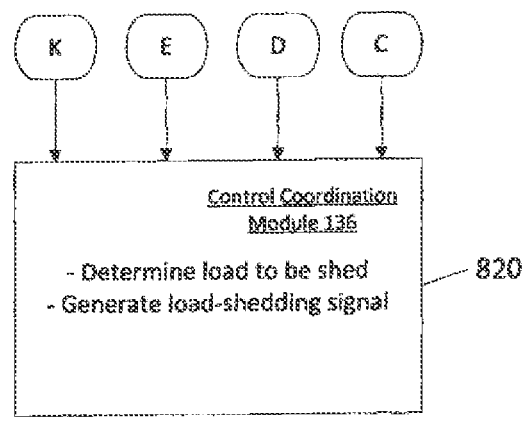

As shown in FIG. 7B, the control coordination module 136 processes signals received from the signal processing module 124, the storage system status monitoring module 128 and the control module determination module 134 to determine if load is to be shed, and if so, generates a load-shedding signal to shed load (step 820).

Figure 7C:
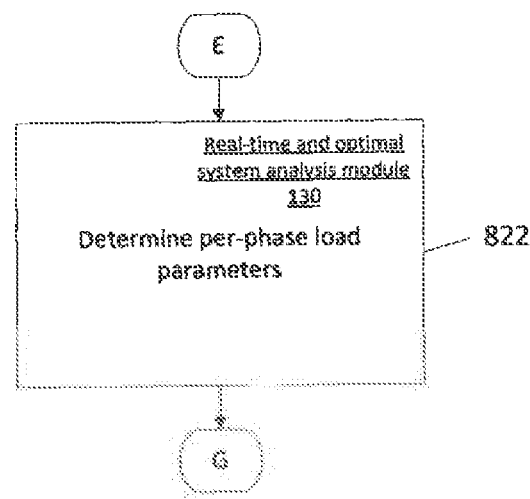

As shown in FIG. 7C, the real-time and optimal system analysis module 130 processes the signal received from the signal processing module 124 to determine per-phase load parameters, and outputs a signal to the operational mode determination module 132 (step 822).

Figure 7D:
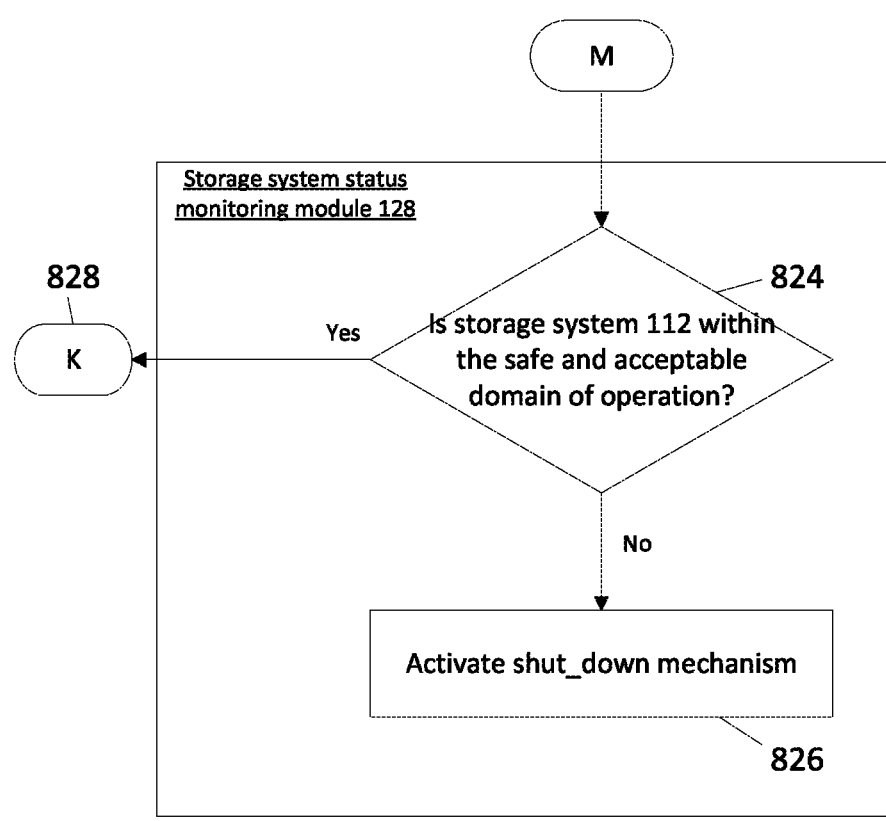

As shown in FIG. 7D, the storage system status monitoring module 128 processes the signal received from the signal processing module 124 to determine if the storage system 112 is within the safe and acceptable domain of operation (step 824). If the storage system 112 is not within the safe and acceptable domain of operation, the storage system 112 is shut down (step 826). If the storage system 112 is within the safe and acceptable domain of operation, a signal is sent to the control coordination module 136 and the operational mode determination module 132 for processing (step 828).

Figure 7E:
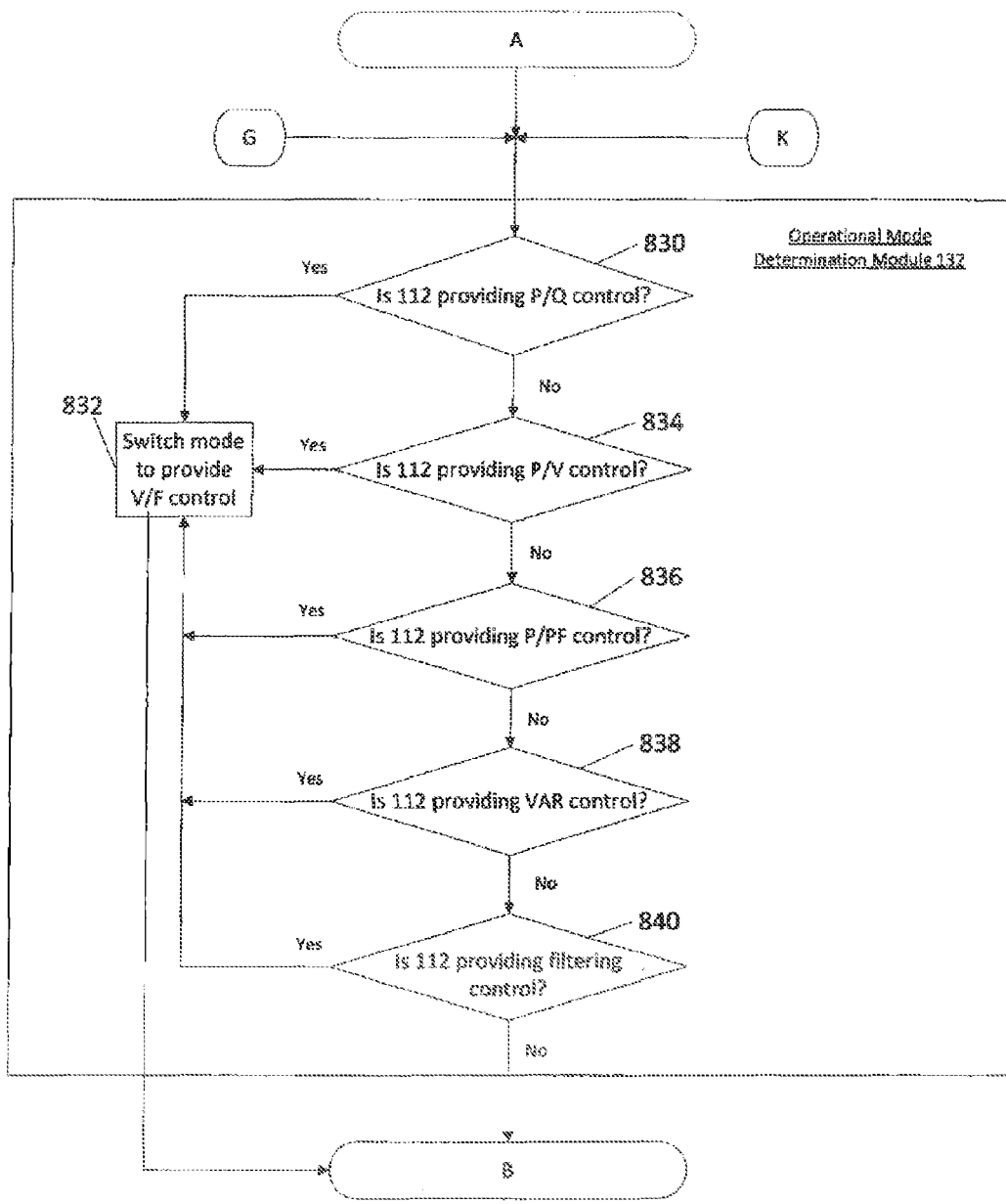

As shown in FIG. 7E, the operational mode determination module 132 processes signals received from the islanding detection module 126, the real-time and optimal system analysis module 130, and the control coordination module 136. A check is performed to determine if the storage system 112 is providing P/Q control (step 830) and if so, a signal is sent to switch the storage system 112 to provide V/F control (step 832). If the storage system 112 is not providing P/Q control, a check is performed to determine if the storage system 112 is providing P/V control (step 834) and if so, a signal is sent to switch the storage system 112 to provide V/F control (step 832). If the storage system 112 is not providing P/V control, a check is performed to determine if the storage system 112 is providing P/PF control (step 836) and if so, a signal is sent to switch the storage system 112 to provide V/F control (step 832). If the storage system 112 is not providing P/PF control, a check is performed to determine if the storage system 112 is providing VAR control (step 838) and if so, a signal is sent to switch the storage system 112 to provide V/F control (step 832). If the storage system 112 is not providing VAR control, a check is performed to determine if the storage system 112 is providing active filtering control (step 840) and if so, a signal is sent to switch the storage system 112 to one of the active_mode and the injection_mode to provide V/F control (step 832). As step 832, a signal is sent to the control mode determination module 134.

Figure 7F:
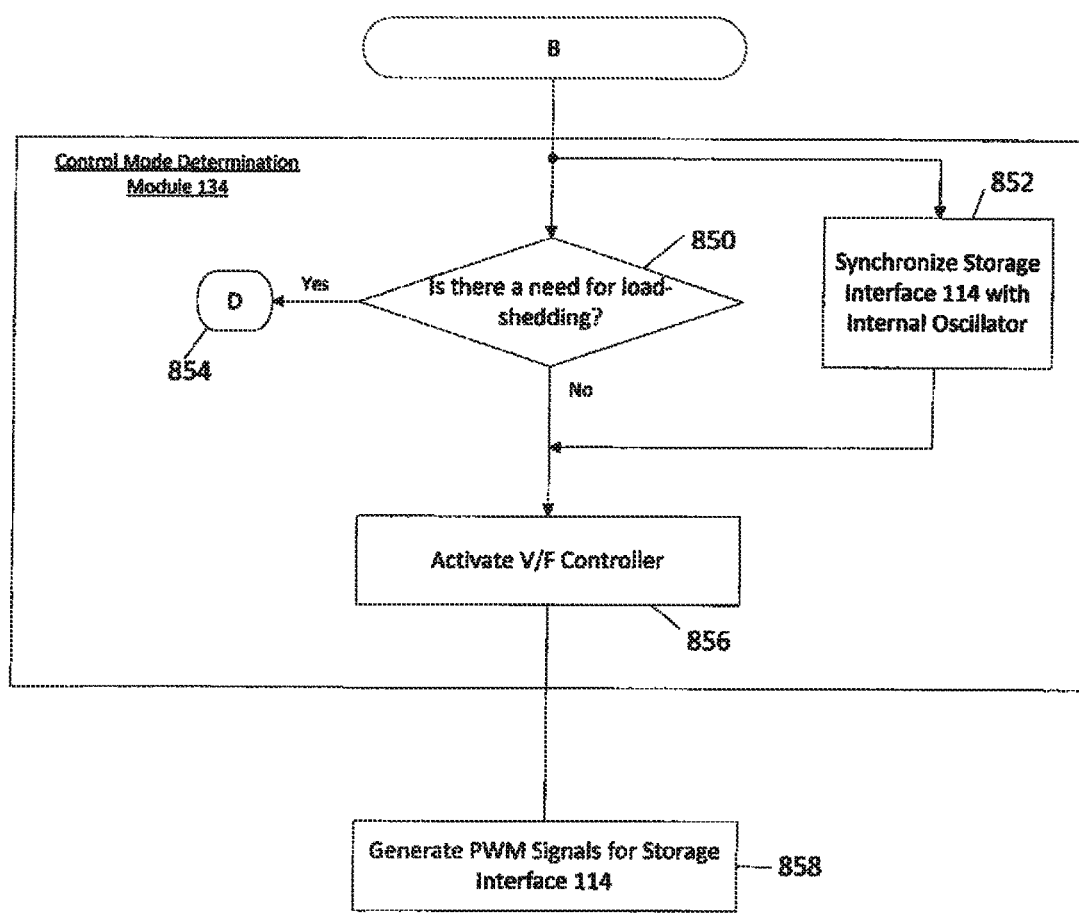

As shown in FIG. 7F, the control mode determination module 134 processes the signal received from the operational mode determination module 132. A check is performed to determine if there is a need for load shedding (step 850) and simultaneously, the storage interface 114 is synchronized with an internal oscillator associated with the CPPM unit 102 (step 852). If there is a need for load shedding, a signal is sent to the control coordination module 136 (step 854). If there is no need for load shedding, the storage system 112 is conditioned to provide V/F control (step 856), by communicating PWM signals to the storage interface 114 (step 858).

Although the CPPM unit is described as communicating with a power system, a local load and a storage system, those skilled in the art will appreciate that the CPPM unit may also communicate with other devices and systems. For example, in another embodiment the CPPM unit exchanges data and signals with another control platform associated with a smart grid protection and control system. As will be appreciated, the smart grid protection and control system is at a higher hierarchical functionality level as compared to the CPPM unit.

Although the CPPM unit is described as being an independent system, those skilled in the art will appreciate that the CPPM unit may be either fully or partially embedded modules associated with the control, protection, and power-energy management of other subsystems. In another embodiment, the CPPM unit may be fully or partially integrated as part of the control, protection, and power-energy management of other subsystems.

Although the storage medium is described as comprising a plurality of battery modules, those skilled in the art will appreciate that the storage medium may be any other type of storage medium or a hybrid of multiple storage media. For example, the storage medium may be a hybrid medium and include more than one type of electrical storage.

Although the storage system status monitoring module is described above as being incorporated within the CPPM unit, those skilled in the art will appreciate that the storage system status monitoring module may be incorporated in conjunction with the BMS of the storage system.

Although preferred embodiments have been described, those of skill in the art will appreciate that variations and modifications may be made with departing from the scope thereof as defined by the appended claims.

REFERENCES

[1] K. Fukuchi, et al., "112 Gb/s optical transponder with PM-QPSK and coherent detection employing parallel FPGA-based real-time digital signal processing, FEC and 100 GbE Ethernet interface," 36th European Conference and Exhibition on Optical Communication, pp. 1-3, September 2010.

[2] K. Fukuchi, E. Le, T. De Gabory, D. Ogasahara, and M. Arikawa, "100G Transmission System Evaluation Using FPGA-based Real-time Digital Signal Processing Platform," in the 16th Opto-Electronics and Communication Conference, 2011, pp. 214-215.

[3] J. C. Moya, A. B. del Campo, J. G. Menoyo, and A. A. Lopez, "Real-time signal processing system for high resolution CWLFM millimeter-wave radars," 2008 IEEE Radar Conference, pp. 1-5, May 2008.

[4] X. Ding, P. A. Crossley, and D. J. Morrow, "Islanding Detection for Distributed Generation," Journal of Electrical Engineering & Technology, vol. 2, no. 1, pp. 19-28, 2007.

[5] S. Xu, W., Mauch, K., and Martel, "An Assessment of Distributed Generation Islanding Detection Methods and Issues for Canada," report #CETC-Varennes 2004-074 (TR), CANMET Energy Technology Centre—Varennes, Natural Resources Canada, p. 55, 2004.

[6] W. BOWER and R. Michael, "Evaluation of islanding detection methods for photovoltaic utility-interactive power systems," Report IEA PVPS T5-09: 2002, no. March, 2002.

[7] H. Karimi, A. Yazdani, and R. Iravani, "Negative-Sequence Current Injection for Fast Islanding Detection of a Distributed Resource Unit," IEEE TRANSACTIONS ON POWER ELECTRONICS, vol. 23, no. 1, pp. 298-307, 2008.

[8] B. Indu Rani, M. Srikanth, G. Saravana Ilango, and C. Nagamani, "An active islanding detection technique for current controlled inverter," Renewable Energy, vol. 51, pp. 189-196, March 2013.

[9] A. Cardenas, "Islanding Detection Method for Multi-Inverter Distributed Generation," Journal of Electromagnetic Analysis and Applications, vol. 01, no. 03, pp. 170-180, 2009.

[10] A. Etxegarai, P. Egula, and I. Zamora, "Analysis of Remote Islanding Detection Methods for Distributed Resources," in International Conference on Renewable Energies and Power Quality (ICREPQ'11), Sapin, 2011.

[11] J. H. Cooley and C. Ave, "Segmentation and Discrimination of Structural and Spectral Information Using Multi-Layered Pulse Couple Neural Networks," in IEEE International Geoscience and Remote Sensing Symposium, IGARSS '99 Proceedings., 1999, no. 0, pp. 80-82.

[12] Y. Kashimori, E. Murase, and T. Kambara, "Role of feedback signals to hindbrain in discriminating between two objects in electrolocation," Proceedings of the 9th International Conference on Neural Information Processing, 2002. ICONIP '02., vol. 1, pp. 30-34.

[13] G. V. Laurin, F. Del Frate, L. Pasolli, C. Notamicola, and P. Engineering, "FOREST/VEGETATION TYPES DISCRIMINATION IN AN ALPINE AREA USING RADARSAT2 AND ALOS PALSAR POLARIMETRIC DATA AND NEURAL NETWORKS," in IEEE International Geoscience and Remote Sensing Symposium (IGARSS), 2012, pp. 5340-5343.

[14] R. Bellotti, F. De Carlo, M. de Tommaso, and M. Lucente, "Migraine detection through spontaneous EEG analysis.," Annual International Conference of the IEEE Engineering in Medicine and Biology Society, vol. 2007, no. 2, pp. 1834-7, January 2007.

[15] a. K. Jain and Y. Zhong, "Page segmentation using texture discrimination masks," Proceedings., International Conference on Image Processing, vol. 3, pp. 308-311, 1995.

[16] S. A. Pourmousavi, R. K. Sharma, B. Asghari, C. Cost, R. Cost, A. Operation, and M. Cost, "A Framework for Real-Time Power Management of a Grid-Tied Microgrid to Extend Battery Lifetime and Reduce Cost of Energy," in IEEE PES Innovative Smart Grid Technologies (ISGT), 2012, pp. 1-8.

[17] L. Wang, E. G. Collins, S. Member, and H. Li, "Optimal Design and Real-Time Control for Energy Management in Electric Vehicles," IEEE TRANSACTIONS ON VEHICULAR TECHNOLOGY, vol. 60, no. 4, pp. 1419-1429, 2011.

[18] C. Zhang, C. Zhang, and S. M. Sharkh, "Estimation of Real-Time Peak Power Capability of a Traction Battery Pack Used in an HEV," 2010 Asia-Pacific Power and Energy Engineering Conference, pp. 1-6, 2010.

[19] M. Sitterly, S. Member, L. Y. Wang, S. Member, G. G. Yin, and C. Wang, "Enhanced Identification of Battery Models for Real-Time Battery Management," IEEE TRANSACTIONS ON SUSTAINABLE ENERGY, vol. 2, no. 3, pp. 300-308, 2011.

[20] K. Huang, L. Santinelli, J.-J. Chen, L. Thiele, and G. C. Buttazzo, "Adaptive power management for real-time event streams," 2010 15th Asia and South Pacific Design Automation Conference (ASP-DAC), pp. 7-12, January 2010.

[21] G. Andria, L. Salvatore, M. Savino, and a. Trotta, "Measurements of power and current components in unbalanced and distorted three-phase systems," European Transactions on Electrical Power, vol. 3, no. 1, pp. 75-83, September 2007.

[22] D. A. Fernandes, S. R. Naidu, and C. A. E. C. Jr, "Instantaneous Sequence-Components Resolution of 3-Phase Variables and Its Application to Dynamic Voltage Restoration," in IEEE Instrumentation and Measurement Technology Conference, 2007, vol. 1, no. 1, pp. 1-4.

[23] J. S. Hsu, "Instataneous Phasor Method for Obtaining Instantaneous Balanced Fundamental Components for Power Quality Control and Continuous Diagnosticd," IEEE Transactions on Power Delivery, vol. 13, no. 4, pp. 1494-1500, 2009.

[24] W. Xiaoyu, L. I. U. Jinjun, H. U. Jinku, M. Yuji, and Y. Chang, "Frequency Characteristics of the Synchronous-Frame Based D-Q Methods for Active Power Filters," Journal of Power Electronics (JPE), vol. 8, no. 1, pp. 91-100, 2008.

[25] P. S. B. Nascimento, H. E. P. de Souza, F. a. S. Neves, and L. R. Limongi, "FPGA Implementation of the Generalized Delayed Signal Cancelation—Phase Locked Loop Method for Detecting Harmonic Sequence Components in Three-Phase Signals," IEEE Transactions on Industrial Electronics, vol. 60, no. 2, pp. 645-658, February 2013.

[26] F. A. S. Neves, H. E. P. De Souza, M. C. Cavalcanti, F. Bradaschia, and E. J. Bueno, "Digital Filters for Fast Harmonic Sequence Component Separation of Unbalanced and Distorted Three-Phase Signals," IEEE Transactions on Industrial Electronics, vol. 59, no. 10, pp. 3847-3859, 2012.

[27] F. Neves, H. Souza, E. Bueno, M. Rizo, F. Bradaschia, and M. Cavalcanti, "A space-vector discrete Fourier transform for detecting harmonic sequence components of three-phase signals," 35th Annual Conference of IEEE industrial Electronics, pp. 3631-3636, November 2009.

[28] M. Z. Kamh and R. Iravani, "A Sequence Frame-Based Distributed Slack Bus Model for Energy Management of Active Distribution Network," IEEE Transactions on smart Grid, vol. 3, no. 2, pp. 828-836, 2012.

[29] C. S. Cheng, "A Three-Phase Power Flow Method for Real-Time Distribution System Analysis," IEEE Transactions on Power Systems, vol. 10, no. 2, pp. 671-670, 1995.

[30] K. L. Lo and C. Zhang, "Decomposed three-phase power flow solution using the sequence component frame," IEE Proceedings C Generation, Transmission and Distribution, vol. 140, no. 3, p. 181, 1993.

[31] L. U and M. Shen, "Design of a Wind Power Generation Monitoring System Based on Wireless Sensor Network," 2010 International Conference on Intelligent System Design and Engineering Application, pp. 556-559, October 2010.

[32] Y. Chen and H. Zhang, "Research and Design of High-Voltage Electronic Power Equipment Monitor System Based on Wireless Communication Technology," 2009 Asia-Pacific Power and Energy Engineering Conference, pp. 1-4, March 2009.

[33] M.-T. Chew, T.-H. Tham, and Y.-C. Kuang, "Electrical Power Monitoring System Using Thermochron Sensor and 1-Wire Communication Protocol," 4th IEEE International Symposium on Electronic Design, Test and Applications (delta 2008), pp. 549-554, January 2008.

[34] K. S. Hung, W. K. Lee, V. O. K. UL, K. S. Lui, P. W. T. Pong, K. K. Y. Wong, G. H. Yang, and J. Zhong, "On Wireless Sensors Communication for Overhead Transmission Line Monitoring in Power Delivery Systems," 2010 First IEEE International Conference on Smart Grid Communications, pp. 309-314, October 2010.

[35] M. Shahraeini and M. H. Javidi, "A new approach for comparing communication infrastructures of power systems," 2011 IEEE Power Engineering and Automation Conference, pp. 529-532, September 2011.

[36] E. Manitsas, R. Singh, B. C. Pal, S. Member, and G. Strbac, "Distribution System State Estimation Using an Artificial Neural Network Approach for Pseudo Measurement Modeling," IEEE Transactions on Power Systems, vol. 27, no. 4, pp. 1888-1896, 2012.

[37] H. Y. Li and B. Yunus, "Assessment of Switched Communication Network Availability for State Estimation of Distribution Networks With Generation," IEEE Transactions on Power Delivery, vol. 22, no. 3, pp. 1424-1432, July 2007.

[38] C. Gómez-quiles, S. Member, and A. Gómez-exposito, "State Estimation for Smart Distribution Substations," IEEE Transactions on Smart Grid, vol. 3, no. 2, pp. 986-995, 2012.

[39] R. Singh, B. C. Pal, and R. a. Jabr, "Distribution system state estimation through Gaussian mixture model of the load as pseudo-measurement," IET Generation, Transmission & Distribution, vol. 4, no. 1, p. 50, 2010.

[40] D. A. Haughton, S. Member, G. T. Heydt, and L. Fellow, "A Linear State Estimation Formulation for Smart Distribution Systems," IEEE Transactions on Power Systems, pp. 1-9, 2013.

[41] R. Singh, E. Manitsas, S. Member, B. C. Pal, and S. Member, "A Recursive Bayesian Approach for Identification of Network Configuration Changes in Distribution," IEEE Transactions on Power Systems, vol. 25, no. 3, pp. 1329-1336, 2010.

[42] J. M. Bloemink, S. Member, and M. R. Iravani, "Control of a Multiple Source Microgrid With Built-in Islanding Detection and Current Limiting," IEEE Transactions on Power Delivery, vol. 27, no. 4, pp. 2122-2132, 2012.

[43] J. A. P. Lopes, S. Member, C. L. Moreira, and A. G. Madureira, "Defining Control Strategies for Analysing MicroGrids Islanded Operation," in IEEE Power Tech, Russia, 2005, pp. 1-7.

[44] D. Shao and Q. W. Tingzhinie, "A Multi-Agent Control Strategy in Microgrid Island mode," in The 6th International Forum on Strategic Technology, 2011, no. 11511075, pp. 429-432.

[45] A. Mehrizi and R. Iravani, "Secondary Control for Microgrids Using Potential Functions: Modeling Issues," Cigre Canada, Conference on Power systems, vol. Paper 182, pp. 1-8, 2009.

[46] F. Gao and M. R. Iravani, "A Control Strategy for a Distributed Generation Unit in Grid-Connected and Autonomous Modes of Operation," IEEE Transactions on Power Delivery, vol. 23, no. 2, pp. 850-859, 2008.

[47] H. Xu and J. U, "FPGA Based Multiplex PWM Generator for Multilevel Converters Applied Wind Power Generator," 2009 Asia-Pacific Power and Energy Engineering Conference, pp. 1-4, March 2009.

[48] S. Jung, H. Huang, and Y. Tzou, "A Three-phase PWM AC-DC Converter with Low Switching Frequency and High Power Factor Using DSP-Based Repetitive Control Technique," in IEEE Annual Power Electronics Specialists Conference (PESC 98), 1998, pp. 517-623.

[49] S. Li and L. Xu, "PWM converter control for grid integration of wind turbines with enhanced power quality," 2008 34th Annual Conference of IEEE Industrial Electronics, pp. 2218-2224, November 2008.

[50] S. Bifaretti, P. Zanchetta, A. Watson, L. Tarisciotti, A. Bellini, and J. Clare, "A modulation technique for high power AC/DC multilevel converters for power system integration," 2010 IEEE Energy Conversion Congress and Exposition, pp. 3697-3704, September 2010.

[51] J. Li, Y. Zhu, H. Xu, and H. Xu, "CPS-SPWM flying capacitor three-level back-to-back converter applicative direct-drive wind power generator system," 2009 International Conference on Sustainable Power Generation and Supply, pp. 1-6, April 2009.

[52] B. Mwinyiwiwa and Z. Wolanski, "UPFC using multiconverter operated by phase-shifted triangle carrier SPWM strategy," IEEE Transactions on Industry Applications, vol. 34, no. 3, pp. 495-500, 1998.

[53] A. Mohamed, M. Elshaer, and O. Mohammed, "Bi-directional AC-DC/DC-AC converter for power sharing of hybrid AC/DC systems," 2011 IEEE Power and Energy Society General Meeting, pp. 1-8, July 2011.

[54] L. Jianlin and W. Liqiao, "APF Based on Multilevel Voltage Source Cascade Convertre with Carrier Phase Shifted SPWM," TENCON 2003. Conference on Convergent Technologies for the Asia-Pacific Region, vol. 1, pp. 264-267, 2001.

What is claimed is:
1. A control, protection and power management system for an energy storage system, comprising:

an interface configured to communicate and provide energy exchange with a host power system, a local load, and the energy storage system; and processing structure configured to:
receive signals from the host power system and the energy storage system, the signals providing information regarding a condition of the host power system and a condition of the energy system;
identify one of an islanding event and a transient event based on the received signals;
when the islanding event is identified, provide control, protection and power management to the energy storage system, comprising:
detecting one of a first islanding mode, a second islanding mode and an anti-islanding mode, wherein the first islanding mode is detected when the energy storage system and the local load are disconnected from the host power system, the second islanding mode is detected when the energy storage system, the local load and a portion of the host power system comprising one or more transformers are disconnected from the rest of the host power system, and the anti-islanding mode is detected when the energy storage system is disconnected from the host power system; and
overriding internal control of the energy storage system and updating the mode of operation of the energy storage system based at least on the detected islanding mode, the energy storage system comprising a plurality of lithium-ion battery modules, wherein the energy storage system is shut down upon detection of the anti-islanding mode.

2. The control, protection and energy management system of claim 1 wherein upon detection of the first or second islanding modes, the mode of operation of the energy storage system is one of an active mode, an injection mode, an absorption mode, a reactive mode, a filter mode, and an inactive mode.

3. The control, protection and energy management system of claim 2 wherein during operation in the active mode, the energy storage system provides power control.

4. The control, protection and energy management system of claim 2 wherein during operation in the injection mode, the energy storage system injects reactive power into the host power system and charges the batteries.

5. The control, protection and energy management system of claim 2 wherein during operation in the absorption mode, the energy storage system absorbs reactive power from the host power system and discharges the batteries.

6. The control, protection and energy management system of claim 2 wherein during operation in the reactive mode, the energy storage system provides power control.

7. The control, protection and energy management system of claim 2 wherein during operation in the filter mode, the energy storage system operates as an active filter.

8. The control, protection and energy management system of claim 2 wherein during operation in the inactive mode, the energy storage system is inactive.

9. The control, protection and energy management system of claim 1 wherein the host power system comprises a transmission grid and a distribution grid.

10. A method for providing control, protection and power management for an energy storage system, the method comprising:
communicating and providing energy exchange with a host power system, a local load and the energy storage system via an interface;
receiving signals from the host power system and the energy storage system, the signals providing information regarding a condition of the host power system and a condition of the energy storage system;
processing the received signals to identify one of an islanding event and a transient event;
when the islanding event is identified, processing the received signals to determine a mode of operation of the energy storage system and to provide control, protection and power management to the energy storage system, wherein providing control, protection and power management to the energy storage system comprises:
detecting one of a first islanding mode, a second islanding mode and an anti-islanding mode, wherein the first islanding mode is detected when the energy storage system and the local load are disconnected from the host power system, the second islanding mode is detected when the energy storage system, the local load and a portion of the host power system comprising one or more transformers are disconnected from the rest of the host power system, and the anti-islanding mode is detected when the energy storage system is disconnected from the host power system; and
overriding internal control of the energy storage system and updating the mode of operation of the energy storage system based at least on the detected islanding mode, the energy storage system comprising a plurality of lithium-ion battery modules, wherein the energy storage system is shut down upon detection of the anti-islanding mode.

11. The method of claim 10 wherein upon detection of the first or second islanding modes, the mode of operation of the energy storage system is one of an active mode, an injection mode, an absorption mode, a reactive mode, a filter mode, and an inactive mode.

12. The method of claim 11 wherein during operation in the active mode, the energy storage system provides power control.

13. The method of claim 11 wherein during operation in the injection mode, the energy storage system injects reactive power into the host power system and charges batteries of the battery modules.

14. The method of claim 11 wherein during operation in the absorption mode, the energy storage system absorbs reactive power from the host power system and discharges batteries of the battery modules.

15. The method of claim 11 wherein during operation in the reactive mode, the energy storage system provides power control.

16. The method of claim 11 wherein during operation in the filter mode, the energy storage system operates as an active filter.

17. The method of claim 11 wherein during operation in the inactive mode, the energy storage system is inactive.

* * * * *